United States Patent
Bickham et al.

(10) Patent No.: US 10,094,973 B2
(45) Date of Patent: *Oct. 9, 2018

(54) OPTICAL FIBER WITH LARGE MODE FIELD DIAMETER AND LOW MICROBENDING LOSSES

(71) Applicant: Corning Incorporated, Corning, NY (US)

(72) Inventors: Scott Robertson Bickham, Corning, NY (US); Kevin Alton Lewis, Montour Falls, NY (US); Snigdharaj Kumar Mishra, Wilmington, NC (US); Manuela Ocampo, Corning, NY (US); Joan Diana Patterson, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/193,860

(22) Filed: Jun. 27, 2016

(65) Prior Publication Data

US 2016/0306107 A1 Oct. 20, 2016

Related U.S. Application Data

(63) Continuation of application No. 14/224,155, filed on Mar. 25, 2014, now Pat. No. 9,383,511.
(Continued)

(51) Int. Cl.
*G02B 6/36* (2006.01)
*G02B 6/02* (2006.01)
(Continued)

(52) U.S. Cl.
CPC ...... *G02B 6/02009* (2013.01); *C03C 25/1065* (2013.01); *C03C 25/285* (2013.01);
(Continued)

(58) Field of Classification Search
None
See application file for complete search history.

(56) References Cited

U.S. PATENT DOCUMENTS 4,474,830 A 10/1984 Taylor
4,585,165 A 4/1986 Iversen
(Continued)

FOREIGN PATENT DOCUMENTS

WO 0147822 7/2001
WO 2005010589 2/2005

OTHER PUBLICATIONS

Mar. 22, 2013 International Search Report issued in counterpart application PCT/US2012/066718.
(Continued)

*Primary Examiner* — Charlie Y Peng
(74) *Attorney, Agent, or Firm* — Kevin L. Bray

(57) ABSTRACT

Optical fibers having a mode field diameter at 1310 nm of at least 8.8 μm, wire mesh covered drum microbending losses at 1550 nm less than 0.03 dB/km, and a 2 m cutoff wavelength less than 1320 nm. The fibers may include a central core region, an inner cladding region, an outer cladding region, a primary coating with an in situ modulus less than 0.20 MPa and glass transition temperature less than −35° C., and a secondary coating with an in situ modulus greater than 1500 MPa. The fibers may further include a depressed index cladding region. The relative refractive index of the central core region may be greater than the relative refractive index of the outer cladding region may be greater than the relative refractive index of the inner cladding region. The fibers may be produced at draw speeds of 30 m/s or greater.

23 Claims, 6 Drawing Sheets

Related U.S. Application Data

(60) Provisional application No. 61/818,608, filed on May 2, 2013.

(51) Int. Cl.
*C03C 25/1065* (2018.01)
*G02B 6/036* (2006.01)
*C03C 25/285* (2018.01)
*C03C 25/326* (2018.01)
*G02B 6/028* (2006.01)

(52) U.S. Cl.
CPC ........ *C03C 25/326* (2013.01); *G02B 6/02395* (2013.01); *G02B 6/0365* (2013.01); *G02B 6/03627* (2013.01); *G02B 6/0281* (2013.01)

(56) References Cited

U.S. PATENT DOCUMENTS

| | | |
|---|---|---|
| 4,609,718 A | 9/1986 | Bishop |
| 4,629,287 A | 12/1986 | Bishop |
| 4,904,051 A | 2/1990 | Broer et al. |
| 5,104,433 A | 4/1992 | Chapin |
| 5,410,567 A | 4/1995 | Brundage |
| 5,962,992 A | 10/1999 | Huang |
| 6,027,062 A | 2/2000 | Bacon |
| 6,316,516 B1 | 11/2001 | Chien |
| 6,326,416 B1 | 12/2001 | Chien |
| 6,477,305 B1 | 11/2002 | Berkey et al. |
| 6,539,153 B2 | 3/2003 | Taneda |
| 6,563,996 B1 | 5/2003 | Winningham |
| 6,904,772 B2 | 6/2005 | Berkey et al. |
| 6,944,382 B2 | 9/2005 | Berkey et al. |
| 7,010,206 B1 * | 3/2006 | Baker .................. C03C 25/106 385/127 |
| 7,076,141 B2 | 7/2006 | Berkey et al. |
| 7,187,833 B2 | 3/2007 | Mishra |
| 7,450,807 B2 | 11/2008 | Bickham |
| 7,565,820 B2 | 7/2009 | Foster |
| 7,620,282 B2 | 11/2009 | Bickham |
| 7,676,129 B1 | 3/2010 | Bookbinder |
| 7,715,675 B2 | 5/2010 | Fabian |
| 7,832,675 B2 | 11/2010 | Bumgarner |
| 7,899,293 B2 | 3/2011 | de Montmorillon |
| 7,903,917 B2 | 3/2011 | Bickham |
| 7,995,889 B2 | 8/2011 | de Montmorillon |
| 8,891,925 B2 | 11/2014 | Bickham |
| 9,057,817 B2 | 6/2015 | Bookbinder |
| 2001/0008906 A1 | 7/2001 | Chawla |
| 2003/0077059 A1 | 4/2003 | Chien |
| 2003/0123839 A1 | 7/2003 | Chou |
| 2005/0249471 A1 | 11/2005 | Aikawa |
| 2008/0056654 A1 | 3/2008 | Bickham |
| 2008/0124028 A1 | 5/2008 | Bickham |
| 2009/0175583 A1 | 6/2009 | Overton |
| 2010/0195966 A1 | 8/2010 | Bickham |
| 2010/0290781 A1 | 11/2010 | Overton |
| 2011/0038593 A1 | 2/2011 | Chien |
| 2011/0064368 A1 | 3/2011 | Bookbinder |
| 2012/0128313 A1 | 5/2012 | Wu |
| 2012/0128314 A1 | 5/2012 | Wu |
| 2013/0044987 A1 | 2/2013 | Bickham |
| 2013/0071115 A1 | 3/2013 | Bennet |
| 2013/0189775 A1 | 7/2013 | Fang |
| 2014/0294355 A1 | 10/2014 | Bickham |
| 2014/0301708 A1 | 10/2014 | Mishra |

OTHER PUBLICATIONS

International Search Report and Written Opinion of the International Searching Authority; PCT/US2014/036060; dated Aug. 26, 2014; 14 Pages.
M. Li et al., "Optical Transmission Fiber Design Evolution," Journal of Lightwave Technology, vol. 26, No. 9, May 1, 2008.
Jeunhomme, Single Mode Fiber Optics, Marcel Dekker, New York, 1990, pp. 39-44.

* cited by examiner

OPTICAL FIBER WITH LARGE MODE FIELD DIAMETER AND LOW MICROBENDING LOSSES

This application is a continuation of U.S. patent application Ser. No. 14/224,155, filed Mar. 25, 2014, which claims the benefit of priority under 35 U.S.C. § 119 of U.S. Provisional Application Ser. No. 61/818,608 filed on May 2, 2013 the content of which is relied upon and incorporated herein by reference in its entirety.

FIELD

The present disclosure relates generally to optical fibers, and particularly to single mode optical fibers with large mode field diameter, low cable cutoff wavelength, and low bend loss.

TECHNICAL BACKGROUND

There is a need for low bend loss optical fibers, particularly for optical fibers utilized in so-called "access" and fiber to the premises (FTTx) optical networks. Optical fiber is often deployed in such networks in a manner that induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables. It has been difficult in some optical fiber designs to achieve both low bend loss and low cable cutoff wavelength at the same time.

High power systems often suffer from non-linear optical effects, including self-phase modulation, four-wave-mixing, cross-phase modulation, and non-linear scattering processes, all of which can cause degradation of signals in high powered systems. In some applications, optical power levels of 1 mW or less are sensitive to non-linear effects, so non-linear effects may still be an important consideration in low power systems. In addition, other optical fiber attributes, such as attenuation, contribute to the degradation of the signal. Generally, an optical waveguide fiber having a large effective area ($A_{eff}$) or large mode field diameter (MFD) reduces signal-degrading non-linear optical effects. Increasing the effective area of an optical waveguide fiber, however, typically results in an increase in macrobending- and microbending-induced losses, which attenuate signal transmission through a fiber. The need for low microbending losses become increasingly important over long transmission distances (e.g. 100 km or more) and in systems with large spacing between regenerators, amplifiers, transmitters and/or receivers. It would be desirable to develop an optical fiber having a large effective area ($A_{eff}$) and low bend losses.

SUMMARY

This disclosure provides optical fibers having a large mode field diameter, low cable cutoff wavelength, and low bending losses. The fibers may include a central core region, a cladding region surrounding the central core region, and a coating surrounding the cladding region. The cladding region may include an inner cladding region and an outer cladding region that surrounds the inner cladding region. A depressed index cladding region may be interposed between the inner cladding region and outer cladding region. The central core region, cladding region, inner cladding region, depressed index cladding region, and outer cladding region may be silica-based glasses, which may include dopants and/or compositional modifiers. The coating may include a primary coating surrounding the cladding region and a secondary coating surrounding the primary coating. The in situ modulus of the primary coating may be lower than the in situ modulus of the secondary coating.

The optical fibers may comprise a central core region having outer radius $r_1$ and relative refractive index $\Delta_1$, a cladding region comprising an inner cladding region having an outer radius $r_2 > 8$ μm and relative refractive index $\Delta_2$ (with minimum $\Delta_{2min}$ and maximum $\Delta_{2max}$) and an outer cladding region having relative refractive index $\Delta_4$, where $\Delta_1 > \Delta_4 > \Delta_2$ (or $\Delta_{2min}$), and the difference between $\Delta_4$ and $\Delta_2$ (or $\Delta_{2min}$) is greater than 0.002%. The ratio $r_1/r_2$ may be greater than or equal to 0.25, or greater than 0.30, or greater than 0.40. The difference between $\Delta_4$ and $\Delta_2$ (or $\Delta_{2min}$) may be greater than 0.005%, or greater than 0.010%, or between 0.030% and 0.060%, or between 0.070% and 0.10%. $\Delta_4$ may be preferably greater than 0.0%, or greater than 0.010%, or greater than 0.020%. The fibers may exhibit a 2 m cutoff wavelength less than or equal to 1360 nm. The fibers may exhibit a 22 m cable cutoff wavelength less than or equal to 1260 nm. The fiber may exhibit a MAC number >7.0. The fiber may exhibit a MAC number <7.5.

Also disclosed herein are optical fibers comprising a central core region having outer radius $r_1$ and relative refractive index $\Delta_1$, a cladding region comprising an inner cladding region having an outer radius $r_2 > 8$ μm and relative refractive index $\Delta_2$ (with minimum $\Delta_{2min}$ and maximum $\Delta_{2max}$) and an outer cladding region surrounding the inner cladding region and having relative refractive index $\Delta_4$, where $\Delta_1 > \Delta_4 > \Delta_2$ (or $\Delta_{2min}$), and where the difference between $\Delta_4$ and $\Delta_2$ (or $\Delta_{2min}$) is greater than 0.010% and the central core region substantially exhibits an α-profile with a less than 10, or less than 6, or less than 4, and or between 1 and 4.

Also disclosed herein are optical fibers comprising a central core region having outer radius $r_1$ and relative refractive index $\Delta_1$, a cladding region comprising an inner cladding region having an outer radius $r_2 > 8$ μm and relative refractive index $\Delta_2$ (with minimum $\Delta_{2min}$ and maximum $\Delta_{2max}$) and an outer cladding region surrounding the inner cladding region and having relative refractive index $\Delta_4$, wherein $\Delta_1 > \Delta_4 > \Delta_2$ (or $\Delta_{2min}$), and wherein the core region comprises a relative refractive index which at least substantially follows a super-Gaussian profile—a profile that at least substantially follows the equation $\Delta_1(r) = \Delta_{1max} \cdot EXP(-((r/a)^\gamma))$, where r is the radial distance from center of the fiber, a is a radial scaling parameter such that when r=a, $\Delta_1 = \Delta_{1max}/e$ (where e is the base of the natural logarithm (~2.71828...)), and γ (gamma) is a positive number. The parameter a may be greater than 4.0, or greater than 4.6, or greater than 4.7.

Also disclosed herein are optical fibers comprising a central core region having outer radius $r_1$ and relative refractive index $\Delta_1$, a cladding region comprising an inner cladding region having an outer radius $r_2 > 8$ μm and relative refractive index $\Delta_2$ (with minimum $\Delta_{2min}$ and maximum $\Delta_{2max}$), where $\Delta_1 > \Delta_2$ (or $\Delta_{2min}$) and wherein the core region comprises a refractive index profile that at least substantially follows a super-Gaussian profile, i.e. a profile which at least substantially follows the equation $\Delta_1(r) = \Delta_{1max} \cdot EXP(-((r/a)^\gamma))$, where r is the radial distance from center of the fiber, a is a radial scaling parameter such that when r=a, $\Delta_1=(\Delta_{1max}/e)$ (where e is the base of the natural logarithm (~2.71828 . . . )), and γ (gamma) is a positive number. The parameter a may be greater than 4.5.

The cladding region may include a depressed index cladding region surrounding the core. The depressed index cladding region may also be referred to herein as a trench or moat region. The depressed index cladding region may be positioned within the cladding and may be positioned between the inner cladding region and outer cladding region. Fibers with a depressed index cladding region may have reduced microbending losses. The depressed index cladding region may have a relative refractive index $\Delta_3<\Delta_4$, where the relative refractive index $\Delta_3$ is less than the relative refractive index $\Delta_4$ of the outer cladding region by an amount between 0.002% and 0.15%. The absolute volume of the depressed index cladding region may be between about 0.3%-$\mu m^2$ and 80%-$\mu m^2$. The depressed index cladding region may be formed by down doping the trench portion of the cladding region (e.g. by fluorine doping or by doping with non-periodic voids) or by updoping the outer cladding region. The fibers may include both a depressed index cladding region and an outer cladding region which is updoped with respect to silica; for example, an outer cladding region that includes an updopant such as germania or chlorine in sufficient amounts to appreciably raise the index of silica.

The primary coating may be formed from a curable composition that includes an oligomer and a monomer. The oligomer may be a urethane acrylate or a urethane acrylate with acrylate substitutions. The urethane acrylate with acrylate substitutions may be a urethane methacrylate. The oligomer may include urethane groups. The oligomer may be a urethane acrylate that includes one or more urethane groups. The oligomer may be a urethane acrylate with acrylate substitutions that includes one or more urethane groups. Urethane groups may be formed as a reaction product of an isocyanate group and an alcohol group.

The primary coating may have an in situ modulus of elasticity of 1 MPa or less, or 0.50 MPa or less, or 0.25 MPa or less, or 0.20 MPa or less, or 0.19 MPa or less, or 0.18 MPa or less, or 0.17 MPa or less, or 0.16 MPa or less, or 0.15 MPa or less.

The glass transition temperature of the primary coating may be −15° C. or less, or −25° C. or less, or −30° C. or less, or −40° C. or less. The glass transition temperature of the primary coating may be greater than −60° C., or greater than −50° C., or greater than −40° C. The glass transition temperature of the primary coating may be between −60° C. and −15° C., or between −60° C. and −30° C., or between −60° C. and −40° C., or between −50° C. and −15° C., or between −50° C. and −30° C., or between −50° C. and −40° C.

The outer diameter of the primary coating may be less than 195 μm, or less than 190 μm, or less than 185 μm, or less than 180 μm.

The secondary coating may be formed from a curable secondary composition that includes one or more monomers. The one or more monomers may include bisphenol-A diacrylate, or a substituted bisphenol-A diacrylate, or an alkoxylated bisphenol-A diacrylate. The alkoxylated bisphenol-A diacrylate may be an ethoxylated bisphenol-A diacrylate. The curable secondary composition may further include an oligomer. The oligomer may be a urethane acrylate or a urethane acrylate with acrylate substitutions. The secondary composition may be free of urethane groups, urethane acrylate compounds, urethane oligomers or urethane acrylate oligomers.

The secondary coating may be a material with a higher modulus of elasticity and higher glass transition temperature than the primary coating. The in situ modulus of elasticity of the secondary coating may be 1200 MPa or greater, or 1500 MPa or greater, or 1600 MPa or greater, or 1700 MPa or greater, or 1800 MPa or greater, or 1900 MPa or greater, or 2100 MPa or greater, or 2400 MPa or greater, or 2700 MPa or greater. The secondary coating may have an in situ modulus between about 1500 MPa and 3000 MPa, or between 1500 MPa and 2100 MPa. The in situ glass transition temperature of the secondary coating may be at least 50° C., or at least 55° C., or at least 60° C. or between 55° C. and 65° C.

The outer diameter of the secondary coating may be less than 250 μm, or less than 240 μm.

The fibers disclosed herein may have optical properties that are G.652 and/or G.657 compliant. The fibers may have a mode field diameter (MFD) greater than 8.6 μm at 1310 nm, or greater than 8.8 μm at 1310 nm, or greater than 9.0 μm at 1310 nm, or greater than 9.1 μm at 1310 nm, or between 9.0 μm and 9.4 μm at 1310 nm.

The fibers disclosed herein may have a 2 m cutoff wavelength less than or equal to 1360 nm, or less than or equal to 1340 nm, or less than or equal to 1320 nm, or less than or equal to 1300 nm. The fibers disclosed herein may have a 22 m cable cutoff wavelength less than or equal to 1260 nm, or less than or equal to 1240 nm, or less than or equal to 1220 nm, or less than or equal to 1200 nm.

The fibers disclosed herein may have a wire mesh covered drum microbending loss of less than 0.030 dB/km at 1550 nm, or less than 0.025 dB/km at 1550 nm, or less than 0.020 dB/km at 1550 nm, or less than 0.015 dB/km at 1550 nm, or less than 0.010 dB/km at 1550 nm, or less than 0.005 dB/km at 1550 nm.

The fibers disclosed herein may have a mode field diameter (MFD) at 1310 nm greater than 8.6 μm, or greater than 8.8 μm, or greater than 9.0 μm, or greater than 9.1 μm; and a 22 m cable cutoff wavelength less than or equal to 1320 nm, or less than or equal to 1300 nm, or less than or equal to 1280 nm, or less than or equal to 1260 nm; and a wire mesh drum microbending loss at 1550 nm of less than 0.30 dB/km, or less than 0.25 dB/km, or less than 0.20 dB/km, or less than 0.15 dB/km, or less than 0.10 dB/km, or less than 0.05 dB/km.

The optical fiber may comprise one or more of the following features:

a central core region having a radius $r_1$ and a relative refractive index $\Delta_1(r)$ in % measured relative to pure silica, said relative refractive index $\Delta_1(r)$ having a minimum $\Delta_{1min}$;

a cladding, said cladding including an inner cladding region surrounding the core region and an outer cladding region surrounding said inner cladding region, said inner cladding region having an outer radius $r_2>8$ μm and a relative refractive index $\Delta_2(r)$ in % measured relative to pure silica, said relative refractive index $\Delta_2(r)$ having a maximum $\Delta_{2max}$ and a minimum $\Delta_{2min}$, said outer cladding region having a relative refractive index $\Delta_4$ in % measured relative to pure silica, said relative refractive index $\Delta_4$ being positive and less than or equal to said minimum $\Delta_{1min}$, said relative refractive index $\Delta_4$ exceeding said minimum $\Delta_{2min}$ by at least 0.002%;

a primary coating surrounding said outer cladding region, said primary coating having an in situ modulus of less than 0.20 MPa and an in situ glass transition temperature of less than −35° C.; and a secondary coating surrounding said primary coating, said secondary coating having an in situ modulus of greater than 1500 MPa;

wherein said relative refractive index $\Delta_1(r)$, $\Delta_2(r)$, and $\Delta_4$ and said primary and secondary coatings are configured such that said optical waveguide fiber exhibits a mode field diameter greater than 8.8 µm at a wavelength of 1310 nm, a 2 m cutoff wavelength less than 1360 nm, and a wire mesh covered drum microbending loss less than 0.03 dB/km at a wavelength of 1550 nm.

DETAILED DESCRIPTION

Figure 1:
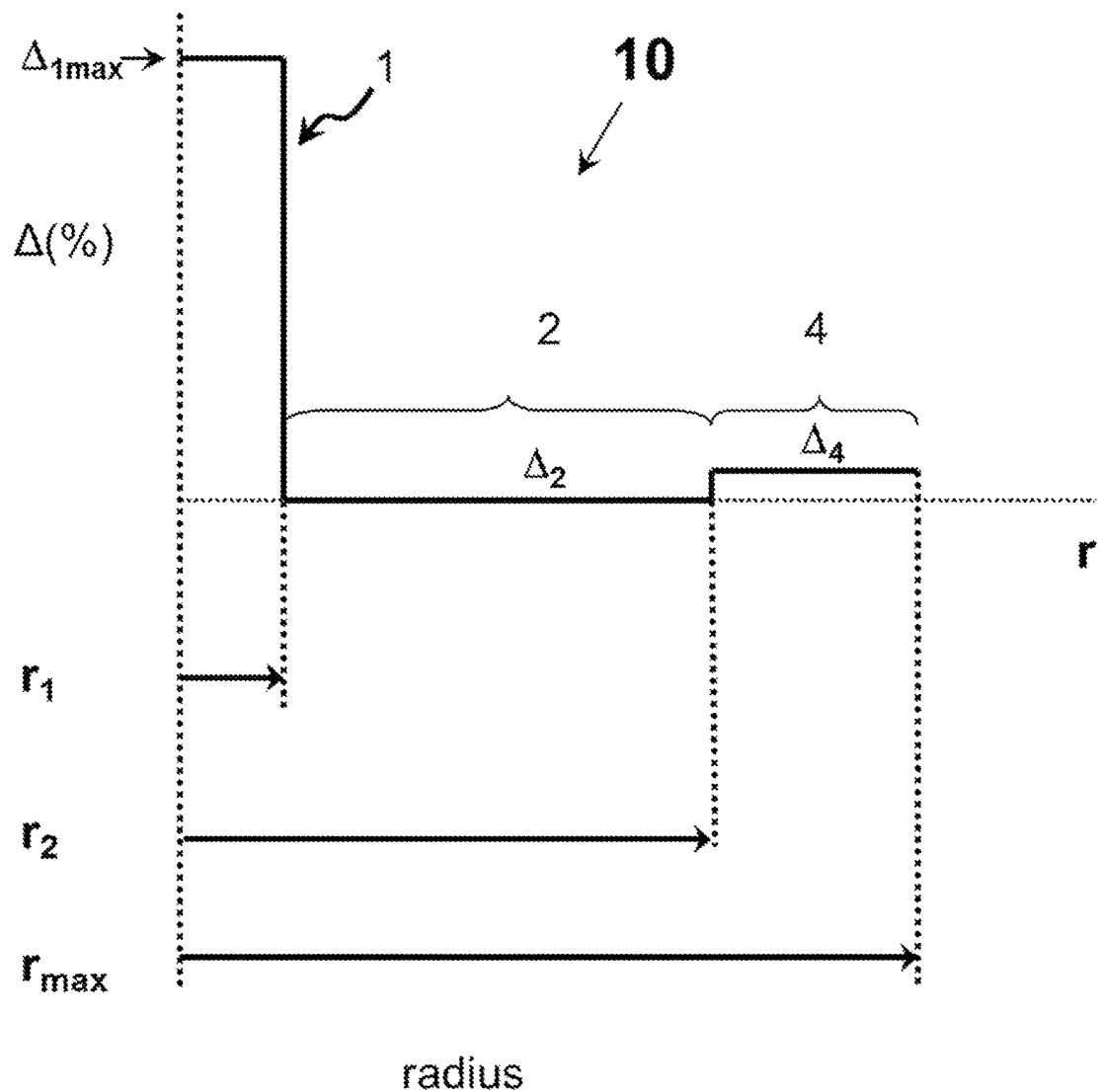
FIG. 1 shows a refractive index profile corresponding to a representative fiber in accordance with the present disclosure.

Additional features and advantages of the invention will be set forth in the detailed description which follows, and in part will be readily apparent to those skilled in the art from that description or recognized by practicing the embodiments as described herein, including the detailed description which follows, the abstract, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the disclosure and together with the description serve to explain the principles and operations of the disclosure. Features shown in the drawing are illustrative of selected embodiments of the present disclosure and are not necessarily depicted in proper scale.

An explanation of selected terms as used herein is now provided:

The "refractive index profile" is the relationship between refractive index or relative refractive index and fiber radius.

The "relative refractive index" or "relative refractive index" is defined as $$\Delta = 100\frac{n^2(r) - n_s^2}{2n^2(r)}$$

where n(r) is the refractive index of the fiber at the radial distance r from the fiber's centerline, unless otherwise specified, and $n_s$ is 1.444, the refractive index of silica at a wavelength of 1550 nm. As used herein, the relative refractive index is represented by $\Delta$ (or "delta") or $\Delta$ % (or "delta %") and its values are given in units of "%", unless otherwise specified. The terms "$\Delta$", "delta", "$\Delta$ %", and "delta %" are used interchangeably herein. The dimensions of $\Delta$ are % and may be referred to herein as "% relative to pure silica" or "% measured relative to pure silica". Regions with a refractive index less than the refractive index of silica have $\Delta<0$ and regions with a refractive index greater than the refractive index of silica have $\Delta>0$.

The term "super-Gaussian profile" or "super Gaussian profile" refers to a relative refractive index profile, expressed in terms of $\Delta(r)$, where r is the radius relative to the centerline of the fiber, which follows the equation, $$\Delta(r) = \Delta_{max} \mathrm{EXP}\left[-\left(\frac{r}{a}\right)^\gamma\right]$$

where $\Delta_{max}$ is the maximum index value of the profile, a is a radial scaling parameter such that when r=a, $\Delta=(\Delta_{max}/e)$ (where e is the base of the natural logarithm (~2.71828 . . . )), and $\gamma$ (gamma) is a positive number.

The term "$\alpha$-profile" refers to a relative refractive index profile, expressed in terms of $\Delta(r)$, where r is the radius relative to the centerline of the fiber, which follows the equation, $$\Delta(r) = \Delta_{max}\left[1 - \left[\frac{|r - r_m|}{(r_2 - r_m)}\right]^\alpha\right]$$

where $\Delta_{max}$ is the maximum index value of the profile, $r_m$ is the radius at which $\Delta(r)=\Delta_{max}$, $r_z$ is the radius at which $\Delta(r)$ is zero, and r is in the range $r_i \leq r \leq r_f$, where $\Delta(r)$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Petermann II method and was determined from:

$$MFD = 2w$$

$$w^2 = 2\frac{\int_0^\infty (f(r))^2 dr}{\int_0^\infty \left(\frac{df(r)}{dr}\right)^2 rdr}$$

where f(r) is the transverse component of the electric field distribution of the guided light and r is radial position in the fiber. Unless otherwise specified, "mode field diameter" or "MFD" refers to the mode field diameter at 1310 nm.

The MAC number of a fiber is the mode field diameter at 1310 nm divided by the 2 m cutoff wavelength (nm).

The bend resistance of a waveguide fiber can be assessed by measuring induced attenuation under prescribed test conditions. The wire mesh covered drum test (WMCD) was used herein to measure microbend losses. Microbend losses are losses in guided light intensity caused by perturbations (e.g. stresses, strains, forces) to the fiber that occur over short length scales (e.g. 1 mm or less).

The cabled cutoff wavelength, or "cable cutoff" (also known as the "22-meter cutoff" or "22 m cutoff") is the minimum wavelength at which an optical fiber will support only one propagating mode. For wavelengths below the cutoff wavelength, multimode transmission may occur and an additional source of dispersion may arise to limit the fiber's information carrying capacity. The 22 m cable cutoff wavelength is typically less than the 2 m cutoff wavelength.

The present disclosure provides fibers that feature, alone or in combination, large mode field diameter, low cable cutoff wavelength, and low microbend-induced attenuation (losses). The present fibers may include a core region, a cladding region surrounding the core region, a primary coating surrounding the cladding region, and a secondary coating surrounding the primary coating. The cladding region may include an inner cladding region and an outer cladding region. The cladding may further include a depressed index cladding region. The depressed index cladding region may surround the inner cladding region and/or may be surrounded by the outer cladding region. The refractive index profile of the core region may be designed to minimize attenuation losses while maintaining a large mode field diameter for the fiber. The primary and secondary coatings may be selected to protect the mechanical integrity of the core and cladding and to minimize the effects of external mechanical disturbances on the characteristics of the light guided in the fiber. The primary and secondary coatings may insure that losses due to bending and other perturbing forces are minimized.

Whenever used herein, radius $r_1$ and relative refractive index $\Delta_1(r)$ refer to the core region, radius $r_2$ and relative refractive index $\Delta_2(r)$ refer to the inner cladding region, radius $r_3$ and relative refractive index $\Delta_3(r)$ refer to the depressed index cladding region, and radius $r_4$ and relative refractive index $\Delta_4(r)$ refer to the outer cladding region, Radial positions $r_1$, $r_2$, $r_3$ and $r_4$ always refer herein to the outermost radii of the central core region, inner cladding region, depressed index cladding region, outer cladding region, respectively.

As will be described further hereinbelow, the relative refractive indices of the central core region, inner cladding region, depressed index cladding region, and outer cladding region may differ. Each of the regions may be formed from silica glass or a silica-based glass. Variations in refractive index may be accomplished by incorporating updopants or downdopants at levels known to provide a targeted refractive index or refractive index profile using techniques known to those of skill in the art.

Reference will now be made in detail to the selected illustrative embodiments of the disclosure. Whenever possible, the same reference numerals will be used throughout the drawings to refer to the same or like parts.

The relative refractive index profile of exemplary fiber 10 is shown in FIG. 1. The relative refractive index profile displays relative refractive index (ordinate) as a function of radial position (abscissa). Fiber 10 includes a central core region 1 having a relative refractive index $\Delta_1$ with maximum $\Delta_{1max}$ and minimum $\Delta_{1min}$ .... In fiber 10, relative refractive index profile of central core region 1 includes a constant or substantially constant index region with relative refractive index $\Delta_{1max}$ and a step decrease from $\Delta_{1max}$ to $\Delta_{1min}=0$. Inner cladding region 2 has relative refractive index $\Delta_2$ and surrounds central core region 1. Outer cladding region 3 surrounds inner cladding region 2 and has relative refractive index $\Delta_4$. The relative refractive indices $\Delta_1$, $\Delta_4$, and $\Delta_2$ may be configured such that $\Delta_1 > \Delta_4 > \Delta_2$.

It is noted for all profiles depicted herein having step boundaries between adjacent region that normal variations in processing conditions may preclude obtaining sharp step boundaries at the interface of adjacent regions. It is to be understood that although boundaries may be depicted as sharp steps, the boundaries in practice may be rounded or otherwise deviate from perfect step function characteristics.

In exemplary fiber 10, regions 1, 2, and 4 are directly adjacent one another. Direct adjacency of central core region 1, inner cladding region 2, and outer cladding region 4, however, is not required and additional, intervening core and/or cladding regions may be included without departing from the scope of the present disclosure. For example, an overcladding region (not shown) may surround outer cladding region 4 and may have a lower relative refractive index less than $\Delta_4$. As another example, a depressed index cladding region may be positioned between inner cladding region 2 and outer cladding region 4 and may have a relative refractive index $\Delta_3$ that is less than $\Delta_4$.

Central core region 1 has an outer radius $r_1$. Outer radius $r_1$ is defined as the first radius moving radially outward from the centerline (r=0) at which $\Delta(r)=\Delta_4$.

The relative refractive index profile of central core region 1 may be a step index profile, such as the one shown in FIG. 1, where $\Delta_{1max}$ may be between about 0.3% to 0.7%, or between about 0.3% to 0.5%, or between about 0.32% to 0.48%, or between 0.36% to 0.46%, or less than 0.4%. The radius $r_1$ of central core region may be between 3 μm and 10 μm, or between 4 μm and 7 μm.

The relative refractive index profile of central core region 1 may be an α-profile with a maximum $\Delta_{1max}$, where the value of α may be less than 7.5, or less than 6, or less than 5, or less than 4, or less than 3, or between 0.5 and 10, or between 10 and 100, or between 15 and 40. The relative refractive index profile of central core region 1 may be an α-profile with a maximum $\Delta_{1max}$ between 0.38% and 0.48% and a value of α of less than 7.5, or less than 5, or less than 3, or between 0.5 and 10. Central core region 1 may have a radius $r_1$ between 4 μm and 7 μm, a relative refractive index profile that is an α-profile with a maximum $\Delta_{1max}$ between 0.38% and 0.70% and a value of α of less than 7.5, or less than 5, or less than 3, or between 0.5 and 10, or between 1 and 3. Central core region 1 may have a radius $r_1$ between 4 μm and 7 μm, a relative refractive index profile that is an α-profile with a maximum $\Delta_{1max}$ between 0.38% and 0.70% and a value of α between 1.5 and 3.5, inclusive.

In fiber 10 of FIG. 1, inner cladding region 2 surrounds central core region 1. The relative refractive index $\Delta_2$ of inner cladding region 2 may have a maximum value $\Delta_{2max}$ and a minimum value $\Delta_{2min}$. When $\Delta_2$ is constant or substantially constant, $\Delta_{2max}=\Delta_{2min}$. Inner cladding region 2 has an inner radius $r_{inner,2}$ and an outer radius $r_{outer,2}$. In fiber 10, the inner radius of inner cladding region 2 coincides with radius $r_t$ of central core region 1 and the outer radius of inner cladding region 2 is $r_2$. In fiber 10, the relative refractive index of inner cladding region 2 becomes constant with increasing radial position and $r_2$ corresponds to the point at which the relative refractive index exhibits a step change at the boundary with outer cladding region 4.

The relative refractive index $\Delta_2$ of inner cladding region 2 may be essentially constant or may vary monotonically. In fiber 30 of FIG. 3, for example, the relative refractive index $\Delta_2$ of inner cladding region 2 decreases monotonically and levels off at a value of $\Delta_{2min}=0\%$ with increasing radial position. In instances where $\Delta_2$ is not constant, a value of $\Delta_2$ may be determined from:

$$\Delta_2 = \frac{\int_{r_{inner,2}}^{r_{outer,2}} \Delta_2(r)\,dr}{(r_{outer,2} - r_{inner,2})}$$

The width of inner cladding region 2 is defined as the difference between the outer radius and inner radius. The width of inner cladding region 2 may be between 3 μm and 13 μm, or between 4 μm to 12 μm, or between 7 μm and 9 μm. The outer radius $r_2$ of inner cladding region 2 may be greater than 8 μm, or greater than 9 μm, or greater than 10 μm, or greater than 20 μm, or greater than 23 μm. The outer radius $r_2$ of inner cladding region 2 may be less than 16 μm, or less than 14 μm, or less than 12 μm, or between 8 μm and 16 μm, or between 8 μm and 14 μm, or between 8 μm and 12 μm. The ratio of radius $r_1$ of central core region 1 to the radius $r_2$ of inner cladding region 2 may be greater than 0.15, or greater than 0.20, or greater than 0.25, or greater than 0.30, or greater than 0.4, or between 0.30 and 0.55, or between 0.15 and 0.25.

Outer cladding region 4 surrounds inner cladding region 2 and has a relative refractive index $\Delta_4$ and an outer radius $r_4$. The relative refractive index $\Delta_4$ of outer cladding region 4 may be higher than relative refractive index $\Delta_2$ of inner cladding region 2. The relative refractive index $\Delta_4$ may be greater than the minimum relative refractive index $\Delta_{2min}$ of inner cladding region 2 by at least 0.002%, or at least 0.005%, or at least 0.010%, or at least 0.020%, or at least 0.030%.

The radius $r_4$ of outer cladding region 4 may be at least 25 μm, or at least 30 μm, or at least 35 μm, or at least 40 μm, or at least 45 μm, or at least 50 μm. The radius $r_4$ of outer cladding region 4 may be such that at least 90%, or at least 95%, or at least 98%, or at least 99% of the optical power transmitted through the fiber is confined within the radius $r_4$.

The volumes $V_2$ and $V_4$, respectively, of inner cladding region 2 and outer cladding region 4 are calculated by integrating $\Delta_4(r)-\Delta_{2min}$ between $r_1$ and $r_2$ in the case of $V_2$, and between $r_2$ and $r_{30}$ (the radius at 30 microns) in the case of $V_4$, and are thus defined as:

$$V_2 = 2\int_{r_1}^{r_2} \Delta_2(r)\,r\,dr$$

$$V_4 = 2\int_{r_2}^{r_{30}} [\Delta_4(r) - \Delta_{2min}]\,r\,dr$$

where $r_1$ is the outer radius of central core region 1, $r_2$ is the outer radius of inner cladding region 2, and $r_{30}$ is a radius of 30 μm. The radius $r_{30}$ is selected as an upper limit in the calculation of $V_4$ because in most fibers, most of the optical power of the guided light is confined within a radius of 30 μm. We note that the radius $r_{30}$ may or may not coincide with the radius $r_4$ of the physical boundary of outer cladding region 4. The dimensions of $V_2$ and $V_4$ are "%4 μm$^2$", which may also be expressed as "Δ % μm$^2$" or as "%-μm$^2$".

All volumes reported herein are expressed as absolute magnitude (i.e., $V_2=|V_2|$, $V_3=|V_3|$, $V_4=|V_4|$, etc.). The volume $V_2$ of inner cladding region 2 may be greater than 2%-μm$^2$, or greater than 5%-μm$^2$, or greater than 10%-μm$^2$, or less than 20%-μm$^2$. The volume $V_2$ of the inner cladding region 2 compared to the volume $V_4$ of the outer cladding region 4 (inside 30 μm) may be greater than 0.7%-μm$^2$, or greater than 2%-μm$^2$, and or greater than 10%-μm$^2$, and or greater than 20%-μm$^2$.

The volume $V_4$ may be at least 2.5%-μm$^2$, or at least 5%-μm$^2$, or at least 10%-μm$^2$, or at least 20%-μm$^2$, or at least 40%-μm$^2$, or less than 80%-μm$^2$. The volume $V_4$ of the outer cladding region 4 (inside 30 microns) compared to volume $V_2$ of the inner cladding region 2 may be greater than 5%-μm$^2$, or greater than 7%-μm$^2$, or greater than 10%-μm$^2$, or greater than 20%-μm$^2$.

Figure 2:
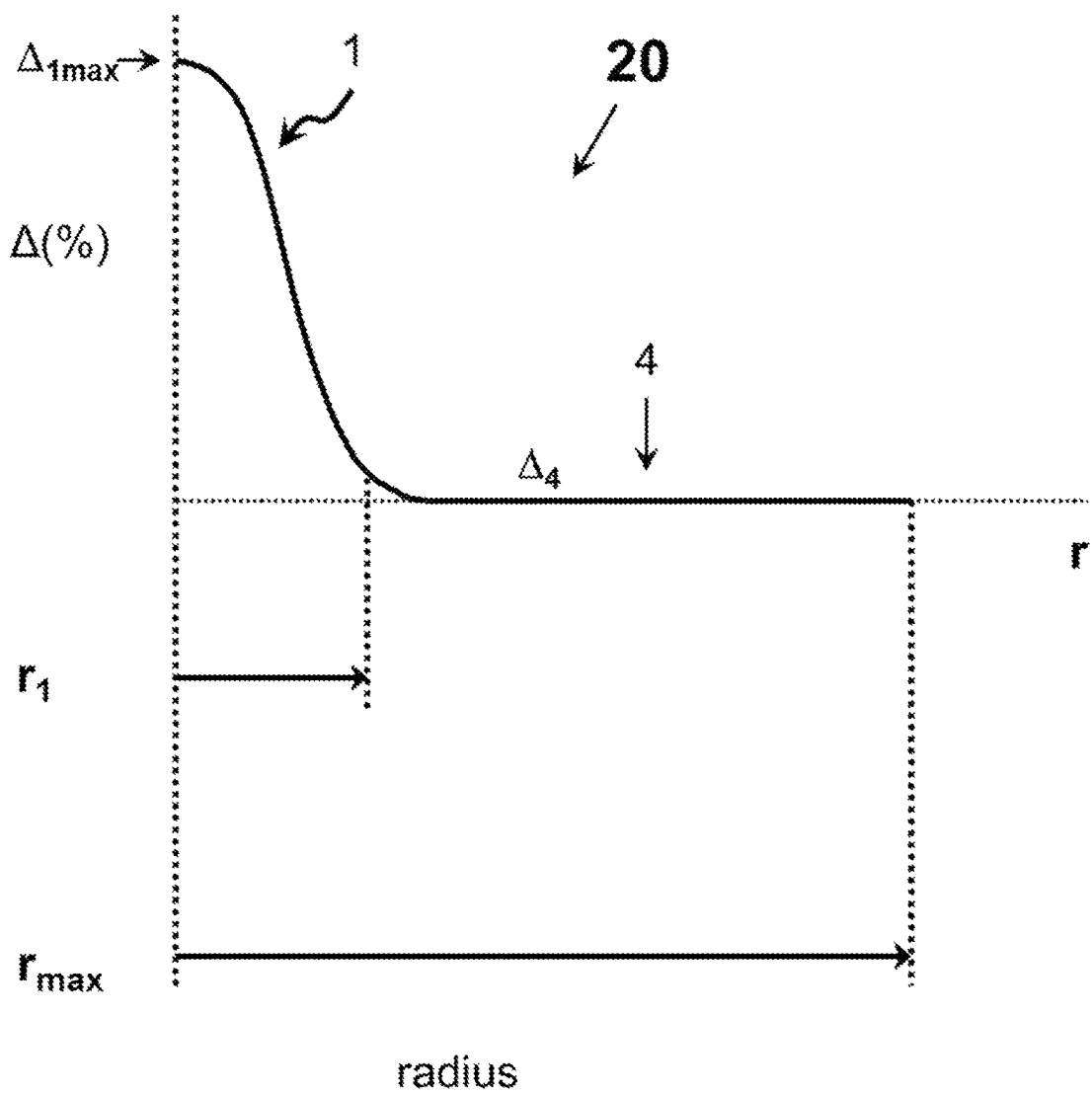
FIG. 2 shows a refractive index profile of a representative fiber in accordance with the present disclosure having a super Gaussian core profile.

FIG. 2 depicts exemplary fiber 20, which includes central core region 1 and outer cladding region 4. Central core region 1 exhibits a super-Gaussian relative refractive index profile $\Delta_1$ given by the equation, $$\Delta_1(r) = \Delta_{1max} \text{EXP}\left[-\left(\frac{r}{a}\right)^\gamma\right]$$

where $\Delta_{1max}$ is the maximum index value of the profile in central core region 1, a is a radial scaling parameter such that when r=a, $\Delta=(\Delta_{max}/e)$ (where e is the base of the natural logarithm (~2.71828 . . . )), and the exponent γ is a positive number. Radial scaling parameter a may be greater than 4.5, or greater than 4.6, or greater than 4.7. A fiber that includes a central core region having a super-Gaussian core profile may lead to a reduction in the attenuation of guided intensity in the optical fiber. The reduction may be due to a continuous, rather than step, variation of the index and viscosity of the glass in the transition from the central core region to the cladding region. The improved attenuation may be a result of less small angle scattering.

Figure 3:
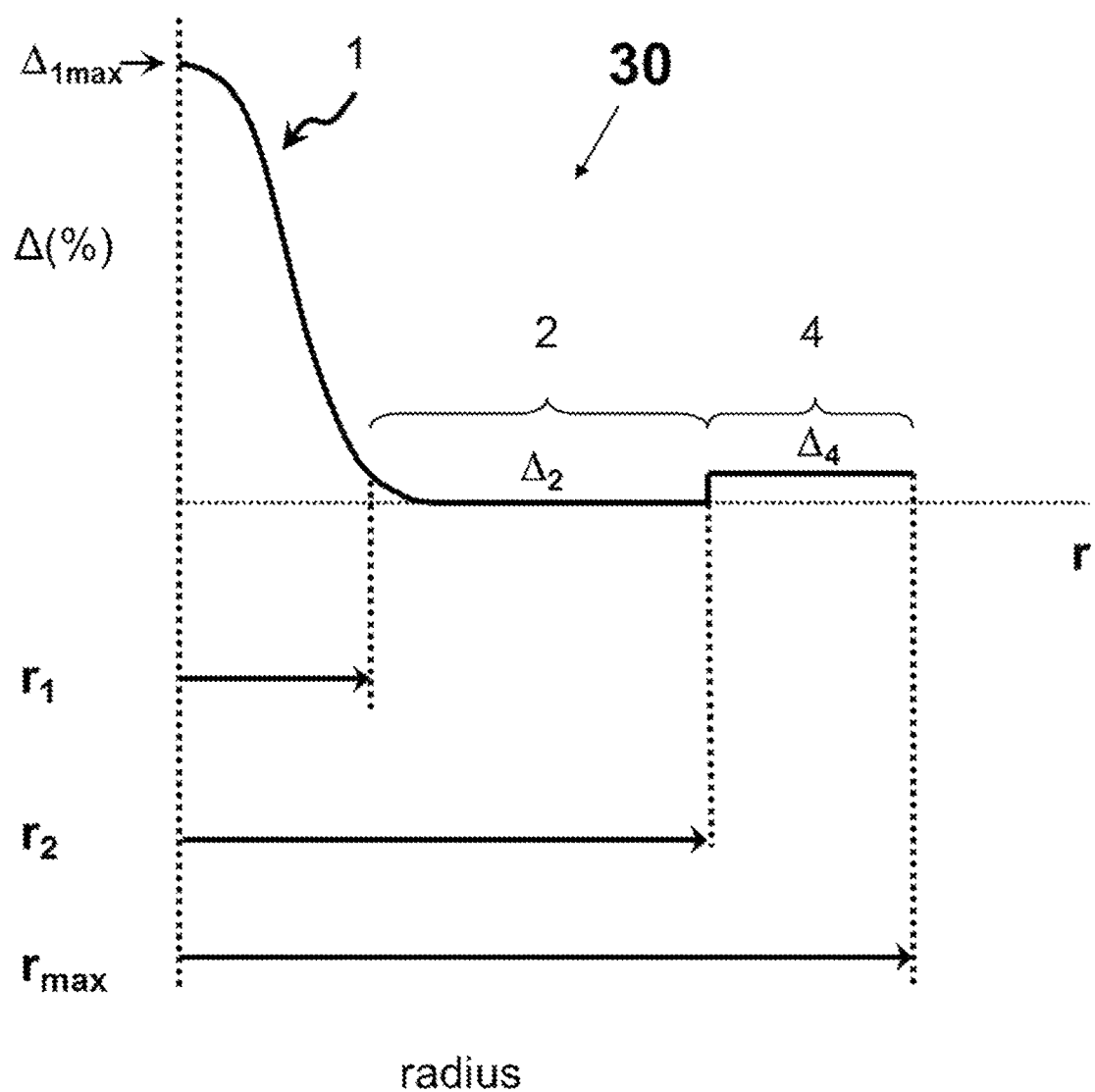
FIG. 3 shows a refractive index profile of a representative fiber in accordance with the present disclosure having a super Gaussian core profile surrounded by a raised-index outer cladding region.

FIG. 3 shows an exemplary fiber 30 that includes central core region 1, inner cladding region 2, and outer cladding region 4, where the relative refractive index profile $\Delta_1$ of central core region 1 is a super-Gaussian core profile. The relative refractive index $\Delta_4$ of outer cladding region 4 may be greater than 0.0%, or greater than 0.010%, or greater than 0.020%. The relative refractive index $\Delta_4$ may be greater than the relative refractive index $\Delta_2$ (or $\Delta_{2min}$) of inner cladding region 2 by at least 0.002%, or at least 0.005%, or at least 0.010%, or at least 0.020%, or at least 0.040%, or at least 0.060%, or at least 0.080%. The difference between relative refractive index $\Delta_4$ and relative refractive index $\Delta_2$ (or $\Delta_{2min}$) may be between 0.03% and 0.06%, or between 0.07% and 0.10%.

Figure 4:
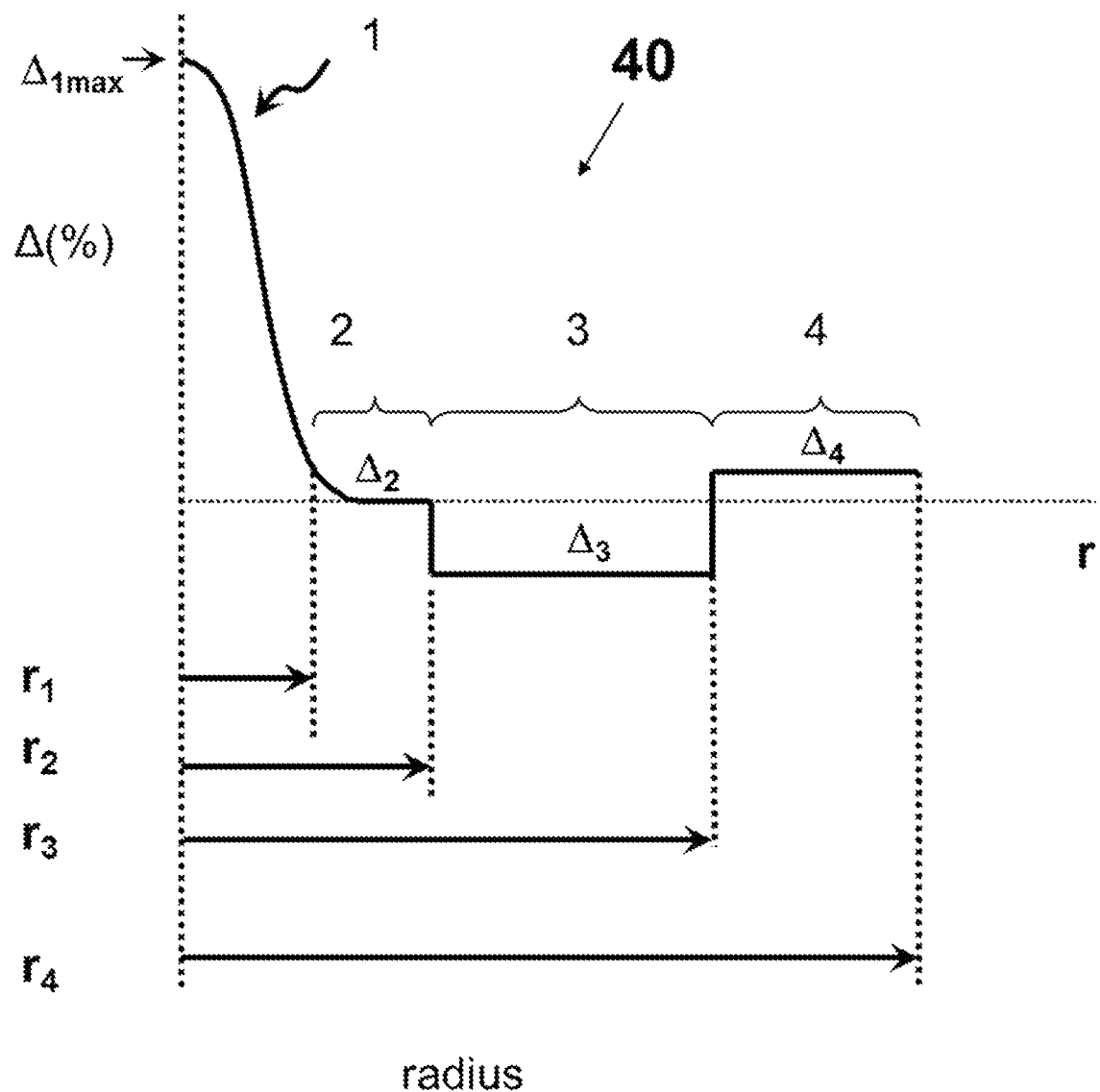
FIG. 4 shows a refractive index profile of a representative fiber in accordance with the present disclosure having a super Gaussian core profile surrounded by a depressed index cladding region and a raised index outer cladding region.

FIG. 4 shows exemplary fiber 40, which includes central core region 1 with super-Gaussian profile $\Delta_1$ (with maximum $\Delta_{1max}$ and minimum $\Delta_{1min}$) and outer radius $r_1$, inner cladding region 2 with relative refractive index $\Delta_2$ (with maximum $\Delta_{2max}$ and minimum $\Delta_{2min}$) and outer radius $r_2$, depressed index cladding region 3 with relative refractive index $\Delta_3$ and outer radius $r_3$, and outer cladding region 4 with relative refractive index $\Delta_4$ and outer radius $r_4$. Outer cladding region 4 surrounds depressed index cladding region 3, which surrounds inner cladding region 2, which surrounds central core region 1. The difference between relative refractive indices $\Delta_4$ and $\Delta_2$ (or $\Delta_{2min}$) may be as described hereinabove and relative refractive index $\Delta_3$ of depressed index cladding region 3 may be lower than $\Delta_2$ (or $\Delta_{2min}$). The relative refractive indices $\Delta_2$, $\Delta_3$, and $\Delta_4$ may be configured such that $\Delta_4 > \Delta_2$ (or $\Delta_{2min}$)$> \Delta_3$. Although depicted as constant in FIG. 4, relative refractive index $\Delta_3$ may have a maximum $\Delta_{3max}$ and a minimum $\Delta_{3min}$. When $\Delta_3$ is constant or substantially constant, $\Delta_{3max} = \Delta_{3min}$. Variations in processing conditions may preclude sharp step boundaries at the interface of depressed index cladding region 3 with inner cladding region 2 or outer cladding region 4 and lead to rounding of the profile at the boundary.

Relative refractive index $\Delta_3$ (or $\Delta_{3min}$) may be less than relative refractive index $\Delta_2$ (or $\Delta_{2min}$) by at least 0.005%, or at least 0.010%, or at least 0.020%, or at least 0.050%, or at least 0.10%, or at least 0.20%. Relative refractive index $\Delta_3$ (or $\Delta_{3min}$) may be less than relative refractive index $\Delta_4$ by at least 0.010%, or at least 0.020%, or at least 0.050%, or at least 0.10%, or at least 0.20%, or at least 0.30%.

Further information about refractive index profiles in accordance with the present disclosure may be found in U.S. Published Patent Application No. 20130044987, the disclosure of which is hereby incorporated by reference in its entirety herein The fibers disclosed herein may be drawn from optical fiber preforms made using conventional manufacturing techniques and using known fiber draw methods and apparatus, for example as is disclosed in U.S. Pat. Nos. 7,565,820, 5,410,567, 7,832,675, 6,027,062, the specifications of which is hereby incorporated by reference.

The primary coating may have a lower modulus than the secondary coating. The primary coating may be formed from a primary composition that includes a curable oligomer. The curable primary composition may also include monomers, a polymerization initiator, and one or more additives. Unless otherwise specified or implied herein, the weight percent (wt %) of a particular component in a curable primary composition refers to the amount of the component present in the curable primary composition on an additive-free basis. Generally, the weight percents of the monomer(s), oligomer(s), and initiator(s) sum to 100%. When present, the amount of an additive is reported herein in units of parts per hundred (pph) relative to the combined amounts of monomer(s), oligomer(s), and initiator(s). An additive present at the 1 pph level, for example, is present in an amount of 1 g for every 100 g of combined monomer(s), oligomer(s), and initiator(s).

The oligomer of the curable primary composition may be a urethane acrylate oligomer, or a urethane acrylate oligomer that includes one or more urethane groups, or a urethane acrylate oligomer that includes one or more aliphatic urethane groups, or a urethane acrylate oligomer that includes a single urethane group, or a urethane acrylate oligomer that includes a single aliphatic urethane group. The urethane group may be formed from a reaction between an isocyanate group and an alcohol group.

The oligomer may be an acrylate-terminated oligomer. Preferred acrylate-terminated oligomers for use in the primary curable compositions include BR3731, BR3741, BR582 and KWS4131, from Dymax Oligomers & Coatings.; polyether urethane acrylate oligomers (e.g., CN986, available from Sartomer Company); polyester urethane acrylate oligomers (e.g., CN966 and CN973, available from Sartomer Company, and BR7432, available from Dymax Oligomers & Coatings); polyether acrylate oligomers (e.g., GENOMER 3456, available from Rahn AG); and polyester acrylate oligomers (e.g., EBECRYL 80, 584 and 657, available from Cytec Industries Inc.). Other oligomers are described in U.S. Pat. Nos. 4,609,718; 4,629,287; and 4,798,852, the disclosures of which are hereby incorporated by reference in their entirety herein.

The oligomer of the primary curable composition may include a soft block with a number average molecular weight ($M_n$) of about 4000 g/mol or greater. Examples of such oligomers are described in U.S. patent application Ser. No. 09/916,536, the disclosure of which is incorporated by reference herein in its entirety. The oligomers may have flexible backbones, low polydispersities, and/or may provide cured coatings of low crosslink densities.

The oligomers may be used singly, or in combination to control coating properties. The total oligomer content of the primary curable composition may be between about 5 wt % and about 95 wt %, or between about 25 wt % and about 65 wt %, or between about 35 wt % and about 55 wt %.

The monomer component of the primary curable composition may be selected to be compatible with the oligomer, to provide a low viscosity formulation, and/or to increase the refractive index of the primary coating. The monomer may also be selected to provide curable compositions having decreased gel times and low moduli. The primary curable composition may include a single monomer or a combination of monomers. The monomers may include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof. The monomer component may include compounds having the general formula $R_2-R_1-O-(CH_2CH_3CH-O)_n-COCH=CH_2$, where $R_1$ and $R_2$ are aliphatic, aromatic, or a mixture of both, and n=1 to 10, or $R_1-O-(CH_2CH_3CH-O)_n-COCH=CH_2$, where $R_1$ is aliphatic or aromatic, and n=1 to 10. Representative examples include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

The monomer component of the primary curable composition may also include a multifunctional (meth)acrylate. As used herein, the term "(meth)acrylate" means acrylate or methacrylate. Multifunctional (meth)acrylates are (meth) acrylates having two or more polymerizable (meth)acrylate moieties per molecule. The multifunctional (meth)acrylate may have three or more polymerizable (meth)acrylate moieties per molecule. Examples of multifunctional (meth) acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol di(meth)acrylate, propoxylated hexanediol di(meth)acrylate, tetrapropyleneglycol di(meth)acrylate, pentapropyleneglycol di(meth)acrylate. A multifunctional (meth)acrylate may be present in the primary curable composition at a concentration of from 0.05-15 wt %, or from 0.1-10 wt %.

The monomer component of the primary curable compositions may include an N-vinyl amide such as an N-vinyl lactam, or N-vinyl pyrrolidinone, or N-vinyl caprolactam. The N-vinyl amide monomer may be present in the primary curable composition at a concentration from 0.1-40 wt %, or from 2-10 wt %.

The curable primary coating composition may include one or more monofunctional (meth)acrylate monomers in an amount from 5-95 wt %, or from 30-75 wt %, or from 40-65 wt %. The curable primary coating composition may include one or more monofunctional aliphatic epoxy acrylate monomers in an amount from 5-40 wt %, or from 10-30 wt %.

The monomer component of the primary curable composition may include a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol) mono(meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl (meth)acrylate, 3-hydroxypropyl (meth)acrylate, and 4-hydroxybutyl (meth)acrylate (each available from Aldrich).

The hydroxyfunctional monomer may be present in an amount sufficient to improve adhesion of the primary coating to the optical fiber. The hydroxyfunctional monomer may be present in the primary curable composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the primary coating. Hydroxyfunctional monomers are described in more detail in U.S. Pat. No. 6,563,996, the disclosure of which is hereby incorporated by reference in its entirety.

The total monomer content of the primary curable composition may be between about 5 wt % and about 95 wt %, or between about 30 wt % and about 75 wt %, or between about 40 wt % and about 65 wt %.

The monomer present in the primary curable composition may include an N-vinyl amide monomer at a concentration of 0.1 to 40 wt % or 2 to 10 wt % in combination with one or more difunctional urethane acrylate oligomers in an amount from 5 to 95 wt %, or from 25 to 65 wt % or from 35 to 55 wt %.

The primary coating composition may include one or more monofunctional (meth)acrylate monomers in an amount of from about 5 to 95 wt %; an N-vinyl amide monomer in an amount of from about 0.1 to 40 wt %; and one or more difunctional urethane acrylate oligomers that include a polyol reacted with an isocyanate to form a urethane, where the oligomer is present in an amount of from about 5 to 95 wt %. The polyol may be a polypropylene glycol and the isocyanate may be an aliphatic diisocyanate.

The primary coating composition may include one or more monofunctional (meth)acrylate monomers in an amount of from about 40 to 65% by weight; an N-vinyl amide monomer in an amount of from about 2 to 10% by weight; and one or more polypropylene glycol-based difunctional urethane acrylate oligomers in an amount of from about 35 to 60% by weight.

The glass transition temperature of the primary coating may influence the microbend performance of the fibers at low temperature. It may be desirable for the primary coating to have a glass transition temperature below the lowest projected use temperature of the coated optical fiber. The glass transition temperature of the primary coating may be $-15°$ C. or less, or $-25°$ C. or less, or $-30°$ C. or less, or $-40°$ C. or less. The glass transition temperature of the primary coating may be greater than $-60°$ C., or greater than $-50°$ C., or greater than $-40°$ C. The glass transition temperature of the primary coating may be or between $-60°$ C. and $-15°$ C., or between $-60°$ C. and $-30°$ C., or between $-60°$ C. and $-40°$ C., or between $-50°$ C. and $-15°$ C., or between $-50°$ C. and $-30°$ C., or between $-50°$ C. and $-40°$ C.

The primary coating may have a lower modulus of elasticity than the secondary coating. A low modulus may allow the primary coating to protect the core and cladding by efficiently dissipating internal stresses that arise when the exterior of the fiber is bent or subjected to an external force.

The in situ modulus of the primary coating may be 1 MPa or less, or 0.50 MPa or less, or 0.25 MPa or less, or 0.20 MPa or less, or 0.19 MPa or less, or 0.18 MPa or less, or 0.17 MPa or less, or 0.16 MPa or less, or 0.15 MPa or less, or between 0.01 MPa and 1.0 MPa, or between 0.01 MPa and 0.50 MPa, or between 0.01 MPa and 0.20 MPa.

The primary curable composition may also include polymerization initiators, antioxidants, and other additives familiar to the skilled artisan.

The polymerization initiator may facilitate initiation of the polymerization process associated with the curing of the primary composition to form the primary coating. Polymerization initiators may include thermal initiators, chemical initiators, electron beam initiators, and photoinitiators. For many (meth)acrylate-based coating formulations, photoinitiators such as ketonic photoinitiating additives and/or phosphine oxide additives may be employed. When used in the photoformation of the primary coating of the present disclosure, the photoinitiator may be present in an amount sufficient to provide rapid ultraviolet curing.

Suitable photoinitiators may include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The photoinitiator component of the primary curable composition may consist of a single photoinitiator or a combination of two or more photoinitiators. The total photoinitiator content of the primary curable composition may be up to about 10 wt %, or between about 0.5 wt % and about 6 wt %.

In addition to monomer(s), oligomer(s), and polymerization initiator(s), the primary curable composition may include other additives such as an adhesion promoter, a strength additive, a reactive diluent, an antioxidant, a catalyst, a stabilizer, an optical brightener, a property-enhancing additive, an amine synergist, a wax, a lubricant, and/or a slip agent. Some additives may operate to control the polymerization process, thereby affecting the physical properties (e.g., modulus, glass transition temperature) of the polymerization product formed from the primary curable composition. Other additives may affect the integrity of the polymerization product of the primary curable composition (e.g., protect against de-polymerization or oxidative degradation). For example, the primary curable composition may include a carrier, as described in U.S. Pat. Nos. 6,326,416 and 6,539,152, the disclosures of which are hereby incorporated by reference herein.

It may be desirable to include an adhesion promoter in the primary curable composition. An adhesion promoter is a compound that may facilitate adhesion of the primary coating and/or primary composition to the cladding. Suitable adhesion promoters include alkoxysilanes, organotitanates, and zirconates. Representative adhesion promoters include 3-mercaptopropyl-trialkoxysilane (e.g., 3-MPTMS, available from Gelest (Tullytown, Pa.)); bis(trialkoxysilyl-ethyl)benzene; acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl)benzene (available from United Chemical Technologies (Bristol, Pa.)); see U.S. Pat. No. 6,316,516, the disclosure of which is hereby incorporated by reference in its entirety herein.

The adhesion promoter may be present in the primary composition in an amount between about 0.02 pph to about 10 pph, or between about 0.05 pph and 4 pph, or between about 0.1 pph to about 2 pph, or between about 0.1 pph to about 1 pph.

The primary coating composition may also include a strength additive, as described in U.S. Published Patent Application No. 20030077059, the disclosure of which is hereby incorporated by reference herein in its entirety. Representative strength additives include mercapto-functional compounds, such as N-(tert-butoxycarbonyl)-L-cysteine methyl ester, pentaerythritol tetrakis(3-mercaptopropionate), (3-mercaptopropyl)-trimethoxysilane; (3-mercaptopropyl)trimethoxysilane, and dodecyl mercaptan. The strength additive may be present in the primary curable composition in an amount less than about 1 pph, or in an amount less than about 0.5 pph, or in an amount between about 0.01 pph and about 0.1 pph.

A representative antioxidant is thiodiethylene bis[3-(3,5-di-tert-butyl)-4-hydroxy-phenyl) propionate] (e.g., IRGANOX 1035, available from BASF).

It may be desirable to include an optical brightener in the primary curable composition. Representative optical brighteners include TINOPAL OB (available from BASF); Blankophor KLA (available from Bayer); bisbenzoxazole compounds; phenylcoumarin compounds; and bis(styryl) biphenyl compounds. The optical brightener may be present in the primary curable composition at a concentration of 0.005 pph-0.3 pph.

It may also be desirable to include an amine synergist in the primary curable composition. Representative amine synergists include triethanolamine; 1,4-diazabicyclo-[2.2.2]octane (DABCO), triethylamine, and methyldiethanolamine. The amine synergist may be present at a concentration of 0.02 pph-0.5 pph.

The secondary coating may protect the fiber from mechanical damage and the external environment. The secondary coating may be formed from a curable secondary composition that includes one or more monomers. The monomers may include ethylenically unsaturated compounds. The curable secondary composition may also include one or more oligomers, one or more polymerization initiators, and one or more additives as described more fully herein.

Unless otherwise specified or implied herein, the weight percent (wt %) of a particular component in a curable secondary composition refers to the amount of the component present in the curable secondary composition on an additive-free basis. Generally, the weight percents of the monomer(s), oligomer(s), and initiator(s) sum to 100%. When present, the amount of an additive is reported herein in units of parts per hundred (pph) relative to the combined amounts of monomer(s), oligomer(s), and initiator(s). An additive present at the 1 pph level, for example, is present in an amount of 1 g for every 100 g of combined monomer(s), oligomer(s), and initiator(s).

In order to reduce cost, the oligomer content, urethane oligomer content, or urethane acrylate oligomer content of the secondary composition may be minimized. Relative to the prevailing secondary compositions known in the art, the oligomer content, urethane oligomer content, or urethane acrylate oligomer content of the present secondary composition is particularly low. Oligomers, urethane oligomers, or urethane acrylate oligomers may be present as a minority component or completely absent from the secondary composition of the present disclosure. Oligomers, urethane oligomers, or urethane acrylate oligomers may be present in the secondary composition in an amount of about 3 wt % or less, or in an amount of about 2 wt % or less, or in an amount of about 1 wt % or less. The secondary composition may also be devoid of oligomers, urethane oligomers, or urethane acrylate oligomers.

The monomer component of the curable secondary composition may include one or more monomers. The one or more monomers may be present in the secondary composition in an amount of 50 wt % or greater, or in an amount from about 75 wt % to about 99 wt %, or in an amount from about 80 wt % to about 99 wt % or in an amount from about 85 wt % to about 98 wt %.

The monomer component of the curable secondary composition may include ethylenically unsaturated compounds. The ethylenically unsaturated monomers may be monofunctional or polyfunctional. The functional groups may be polymerizable groups and/or groups that facilitate or enable crosslinking. In combinations of two or more monomers, the constituent monomers may be monofunctional, polyfunctional, or a combination of monofunctional and polyfunctional compounds. Suitable functional groups for ethylenically unsaturated monomers include, without limitation, (meth)acrylates, acrylamides, N-vinyl amides, styrenes, vinyl ethers, vinyl esters, acid esters, and combinations thereof Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofiurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated (4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is alkyl group with 7 or more carbons.

Many suitable monomers are either commercially available or readily synthesized using reaction schemes known in the art. For example, most of the above-listed monofunctional monomers can be synthesized by reacting an appropriate alcohol or amide with an acrylic acid or acryloyl chloride.

Representative polyfunctional ethylenically unsaturated monomers include, without limitation, alkoxylated bisphenol A diacrylates, such as ethoxylated bisphenol A diacrylate, with the degree of alkoxylation being 2 or greater. The monomer component of the secondary composition may include ethoxylated bisphenol A diacrylate with a degree of ethoxylation ranging from 2 to about 30 (e.g. SR349 and SR601 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

In addition to functioning as a polymerizable moiety, monofunctional monomers may also be included in the curable secondary composition for other purposes. Monofunctional monomer components may, for example, influence the degree to which the cured product absorbs water, adheres to other coating materials, or behaves under stress.

The secondary composition may or may not include an oligomeric component. As indicated hereinabove, if present, oligomers may be present as a minor constituent in the secondary composition. One or more oligomers may be present in the secondary composition. One class of oligomers that may be included in the secondary composition is ethylenically unsaturated oligomers. When employed, suitable oligomers may be monofunctional oligomers, polyfunctional oligomers, or a combination of a monofunctional oligomer and a polyfunctional oligomer. If present, the oligomer component of the secondary composition may include aliphatic and aromatic urethane (meth)acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers or combinations thereof. The secondary composition may be free of urethane groups, urethane acrylate compounds, urethane oligomers, or urethane acrylate oligomers.

The oligomeric component the secondary composition may include a difunctional oligomer. A difunctional oligomer may have a structure according to formula (I) below:

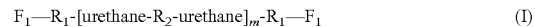

where $F_1$ may independently be a reactive functional group such as acrylate, methacrylate, acrylamide, N-vinyl amide, styrene, vinyl ether, vinyl ester, or other functional group known in the art; $R_1$ may include, independently, $-C_{2\text{-}12}O-$, $-(C_{2\text{-}4}-O)_n-$, $-C_{2\text{-}12}O-(C_{2\text{-}4}-O)_n-$, $-C_{2\text{-}12}O-(CO-C_{2\text{-}5}O)_n-$, or $-C_{2\text{-}12}O-(CO-C_{2\text{-}5}\ NH)_n-$ where n is a whole number from 1 to 30, including, for example, from 1 to 10; $R_2$ may be a polyether, polyester, polycarbonate, polyamide, polyurethane, polyurea, or combination thereof; and m is a whole number from 1 to 10, including, for example, from 1 to 5. In the structure of formula (I), the urethane moiety may be the residue formed from the reaction of a diisocyanate with $R_2$ and/or $R_1$. The term "independently" is used herein to indicate that each $F_1$ may differ from another $F_1$ and the same is true for each $R_1$.

The oligomer component of the curable secondary composition may include a polyfunctional oligomer. The polyfunctional oligomer may have a structure according to formula (II), formula (III), or formula (IV) set forth below:

multiurethane-$(F_2-R_1-F_2)_x$     (II)

polyol-[(urethane $-R_2$-urethane)$_m$-$R_1$—$F_2$]$_x$     (III)

multiurethane-$(R_1-F_2)_x$     (IV)

where $F_2$ may independently represent from 1 to 3 functional groups such as acrylate, methacrylate, acrylamide, N-vinyl amide, styrene, vinyl ether, vinyl ester, or other functional groups known in the art; $R_1$ can include $-C_{2-12}O-$, $-(C_{2-4}-O)_n-$, $-C_{2-12}O-(C_{2-4}-O)_n-$, $-C_{2-12}O-(CO-C_{2-5}O)_n-$, or $-C_{2-12}O-(CO-C_{2-5}NH)_n-$ where n is a whole number from 1 to 10, including, for example, from 1 to 5; $R_2$ may be polyether, polyester, polycarbonate, polyamide, polyurethane, polyurea or combinations thereof; x is a whole number from 1 to 10, including, for example, from 2 to 5; and m is a whole number from 1 to 10, including, for example, from 1 to 5. In the structure of formula (II), the multiurethane group may be the residue formed from reaction of a multiisocyanate with $R_{2max}$ Similarly, the urethane group in the structure of formula (III) may be the reaction product formed following bonding of a diisocyanate to $R_2$ and/or $R_1$.

Urethane oligomers may be prepared by reacting an aliphatic or aromatic diisocyanate with a dihydric polyether or polyester, most typically a polyoxyalkylene glycol such as a polyethylene glycol. Moisture-resistant oligomers may be synthesized in an analogous manner, except that polar polyethers or polyester glycols are avoided in favor of predominantly saturated and predominantly nonpolar aliphatic diols. These diols may include alkane or alkylene diols of from about 2-250 carbon atoms that may be substantially free of ether or ester groups.

Polyurea elements may be incorporated in oligomers prepared by these methods, for example, by substituting diamines or polyamines for diols or polyols in the course of synthesis. The presence of minor proportions of polyureas in the secondary coating composition is not considered detrimental to coating performance, provided that the diamines or polyamines employed in the synthesis are sufficiently non-polar and saturated as to avoid compromising the moisture resistance of the system.

The secondary coating compositions may also contain a polymerization initiator to facilitate polymerization (curing) of the secondary composition after its application to a glass fiber or a glass fiber previously coated with a primary or other layer. Polymerization initiators suitable for use in the compositions of the present invention may include thermal initiators, chemical initiators, electron beam initiators, microwave initiators, actinic-radiation initiators, and photoinitiators. For many acrylate-based coating formulations, photoinitiators, such as the known ketonic photoinitiating and/or phosphine oxide additives, may be used. When used in the compositions of the present invention, the photoinitiator may be present in an amount sufficient to provide rapid ultraviolet curing. The photoinitiator may be present in an amount ranging from about 0.5 wt % to about 10 wt %, or from about 1.5 wt % to about 7.5 wt %, or in an amount of about 3 wt %.

The amount of photoinitiator may be adjusted to promote radiation cure to provide reasonable cure speed without causing premature gelation of the coating composition. A desirable cure speed may be a speed sufficient to cause curing of the coating composition of greater than about 90%, or greater than 95%). As measured in a dose versus modulus curve, a cure speed for coating thicknesses of about 75 µm may be, for example, less than 1.0 J/cm$^2$ or less than 0.5 J/cm$^2$.

Suitable photoinitiators may include, without limitation, 2,4,6-trimethylbenzoyl-diphenylphosphine oxide (e.g. Lucirin TPO); 1-hydroxycyclohexylphenyl ketone (e.g. Irgacure 184 available from BASF); (2,6-diethoxybenzoyl)-2,4,4-trimethylpentyl phosphine oxide (e.g. in commercial blends Irgacure 1800, 1850, and 1700, BASF); 2,2-dimethoxy-2-phenyl acetophenone (e.g., Irgacure, 651, BASF); bis(2,4,6-trimethylbenzoyl)phenyl phosphine oxide (e.g., Irgacure 819, BASF); (2,4,6-triiethylbenzoyl)diphenyl phosphine oxide (e.g., in commercial blend Darocur 4265, BASF); 2-hydroxy-2-methyl-1-phenylpropane-1-one (e.g., in commercial blend Darocur 4265, BASF) and combinations thereof.

In addition to the above-described components, the secondary coating composition of the present invention may optionally include an additive or a combination of additives. Representative additives include, without limitation, antioxidants, catalysts, lubricants, low molecular weight non-crosslinking resins, adhesion promoters, and stabilizers. Additives may operate to control the polymerization process, thereby affecting the physical properties (e.g., modulus, glass transition temperature) of the polymerization product formed from the composition. Additives may affect the integrity of the polymerization product of the composition (e.g., protect against de-polymerization or oxidative degradation).

The secondary composition may include thiodiethylene bis(3,5-di-tert-butyl)-4-hydroxyhydrocinnamate (e.g., Irganox 1035, available from BASF) as an antioxidant. The secondary composition may include an acrylated acid adhesion promoter (such as Ebecryl 170 (available from UCB Radcure (Smyrna Ga.)). Other suitable materials for use in secondary coating materials, as well as considerations related to selection of these materials, are well known in the art and are described in U.S. Pat. Nos. 4,962,992 and 5,104,433, the disclosures of which are hereby incorporated by reference.

Even with low oligomer content, the present secondary compositions may result in a secondary coating material having high tensile strength and a high modulus of elasticity (Young's modulus). The secondary coating may have a higher modulus of elasticity and higher glass transition temperature than the primary coating.

The tensile strength of the polymerization product of the secondary composition of the present disclosure, when prepared in the form of cured rods, may be at least 50 MPa. When measured on cured coating rods at room temperature (~21° C.), the modulus of elasticity of the cured product of the secondary composition may be in the range from about 1400 MPa to about 2200 MPa, or in the range from about 1700 MPa to about 2100 MPa, or in the range from about 1600 MPa to about 3000 MPa. The in situ modulus of elasticity of the secondary coating may be 1200 MPa or greater, or 1500 MPa or greater, or 1800 MPa or greater, or 2100 MPa or greater, or 2400 MPa or greater, or 2700 MPa or greater.

High modulus secondary coatings may offer better protection of the fiber against mechanical damage and better microbend performance. However, high speed processing of high modulus secondary coatings in the draw tower may be a challenge because of an increased tendency to of the draw process to generate defects such as flat spots and wind induced point defects (WIPD) in the secondary coating that ultimately compromise fiber performance.

During the development of oligomer-free coatings urethane-oligomer-free coatings and urethane-acrylate-oligomer-free coatings, it was found that removal of the oligomer from the formulation, without modifying other components, may result in a secondary coating with a modulus of higher than 2000 MPa. Such secondary coatings that may be difficult to process at high speeds in the draw tower. Accordingly, it may be desirable to compensate for the effect of removing the oligomer by formulating the secondary composition to include monomers with long flexible (e.g. ethoxylated) chains between functional groups. Long flexible chains may increase the distance between crosslinks, may decrease the crosslink density and may ultimately lower the modulus of the cured secondary coating. A potential drawback of such monomers is that they may have a lower glass transition temperature ($T_g$) and may tend to decrease the $T_g$ of the cured secondary coating. Secondary coatings with low $T_g$ may not be desirable because a low $T_g$ may result in a material that is too soft at the time of application and may lead to defects during processing at high speed. Higher $T_g$ secondary coatings may be harder at room temperature and may provide better mechanical protection to the optical fiber. If the $T_g$ is too high, however, the coating may be sufficiently stiff to make the fiber more prone to defects during processing.

The secondary coating of the present disclosure may be designed to achieve a secondary coating with moderate $T_g$ that imparts adequate mechanical protection and bend insensitivity to the optical fiber while still allowing the fiber to be processed defect-free in high speed draw towers.

The $T_g$ of cured rods prepared from the cured product of the secondary coating composition may be at least about 50° C., or at least 55° C., or at least 60° C., or between 55° C. and 65° C.

The secondary composition may be devoid of an oligomeric component, a urethane oligomeric component, or a urethane-acrylate oligomeric component, and the monomeric component may include ethoxylated (4) bisphenol-A diacrylate monomer, ethoxylated (30) bisphenol-A diacrylate monomer, and epoxy diacrylate monomer. The ethoxylated (4) bisphenol-A diacrylate monomer may be present in an amount ranging from about 50 wt % to about 90 wt %, or from about 60 wt % to about 80 wt %, or and from about 70 wt % to about 75 wt %. The ethoxylated (30) bisphenol-A diacrylate monomer may be present in an amount ranging from about 5 wt % to about 20 wt %, or from about 7 wt % to about 15 wt %, or from about 8 wt % to about 12 wt %. The epoxy diacrylate monomer may be present in an amount of ranging from about 5 wt % to about 25 wt %, or from about 10 wt % to about 20 wt %, or from about 12 wt % to about 18 wt %.

The secondary composition may be devoid of an oligomeric component, a urethane oligomeric component, or a urethane-acrylate oligomeric component, and the monomeric component may include ethoxylated (4) bisphenol-A diacrylate monomer, ethoxylated (10) bisphenol-A diacrylate monomer, and epoxy diacrylate monomer. The ethoxylated (4) bisphenol-A diacrylate monomer may be present in an amount ranging from about 30 wt % to about 80 wt %, or from about 40 wt % to about 70 wt %, or from about 50 wt % to about 60 wt %. The ethoxylated (10) bisphenol-A diacrylate monomer may be present in an amount ranging from about 10 wt % to about 50 wt %, or from about 20 wt % to about 40 wt %, or from about 25 wt % to about 35 wt %. The epoxy diacrylate monomer may be present in an amount ranging from about 5 wt % to about 25 wt %, or from about 10 wt % to about 20 wt %, or from about 12 wt % to about 18 wt %.

The secondary composition may be devoid of an oligomeric component, a urethane oligomeric component, or a urethane-acrylate oligomeric component, and the monomeric component may include ethoxylated (4) bisphenol-A diacrylate monomer, ethoxylated (10) bisphenol-A diacrylate monomer, ethoxylated (30) bisphenol-A diacrylate monomer, and epoxy diacrylate monomer. The ethoxylated (4) bisphenol-A diacrylate monomer may be present in an amount ranging from about 40 wt % to about 80 wt %, or from about 60 wt % to about 70 wt %. The ethoxylated (10) bisphenol-A diacrylate monomer may be present in an amount ranging from about 1 wt % to about 30 wt %, or from about 5 wt % to about 10 wt %. The ethoxylated (30) bisphenol-A diacrylate monomer may be present in an amount ranging from about 5 wt % to about 20 wt %, or in an amount of about 10 wt %. The epoxy diacrylate monomer may be present in an amount ranging from about 5 wt % to about 25 wt %, or in an amount of about 15 wt %.

The secondary composition may be devoid of an oligomeric component, a urethane oligomeric component, or a urethane-acrylate oligomeric component, and the monomeric component may include ethoxylated (10) bisphenol A diacrylate monomer, tripropylene glycol diacrylate monomer, ethoxylated (4) bisphenol A diacrylate monomer, and epoxy diacrylate monomer. The ethoxylated (10) bisphenol A diacrylate monomer may be present in an amount ranging from about 10 wt % to about 50 wt %. The tripropylene glycol diacrylate monomer may be present in an amount from about 5 wt % to about 40 wt %. The ethoxylated (4) bisphenol A diacrylate monomer may be present in an amount from about 10 wt % to about 55 wt %. The epoxy diacrylate monomer may be present in an amount up to about 15 wt %.

The secondary composition may comprise from about 40 wt % to 80 wt % of ethoxylated (4) bisphenol A monomer, from about 0 wt % to about 30% of ethoxylkated (10) bisphenol A monomer, from about 0 wt % to about 25% wt % of ethoxylated (30) bisphenol A monomer, from about 5 wt % to 18 wt % of epoxy acrylate, from about 0 wt % to 10 wt % of tricyclodecane dimethanoldiacrylate monomer, from about 0.1 wt % to 40% of one or more photoinitiators, from about 0 pph to 5 pph by weight of slip additive; and from 0 pph to about 5 pph by weight of an antioxidant. The secondary composition may further comprise 3% or less oligomer, or 1% or less oligomer, or may be devoid of oligomer. The epoxy acrylate may be an epoxy acrylate monomer. The epoxy acrylate may be bisphenol A epoxy diacrylate. The epoxy acrylate may be an unmodified epoxy acrylate, for example an epoxy acrylate which is not modified with fatty acid, amine, acid, or aromatic functionality. Such compositions may have a viscosity at 45° C. of at least about 3 Poise and when cured, may exhibit a Young's modulus of from about 1400 MPa to about 2100 MPa. The compositions may exhibit a glass transition temperature of at least about 55° C. The monomeric component may include an alkoxylated bisphenol A diacrylate monomer having at least 10 alkoxy groups.

The primary and secondary curable compositions may be applied to the glass portion of the coated fiber after it has been drawn from the preform. The primary and secondary compositions may be applied immediately after cooling. The curable compositions may then be cured to produce the coated optical fiber. The method of curing may be thermal, chemical, or radiation induced, such as by exposing the applied curable composition on the glass fiber to ultraviolet light, actinic radiation, microwave radiation, or an electron beam, depending upon the nature of the coating composition(s) and polymerization initiator being employed. It may be advantageous to apply both a primary curable composition and a secondary curable composition in sequence following the draw process. Methods of applying dual layers of curable compositions to a moving glass fiber are disclosed in U.S. Pat. Nos. 4,474,830 and 4,585,165, the disclosures of which are hereby incorporated by reference herein. The primary curable composition may alternatively be applied and cured to form the primary coating material before applying and curing the secondary curable composition to form the secondary coating.

Coated fibers with low bend loss, low cable cutoff wavelength, and high mode field diameter as described herein are achievable in processes performed at high draw speeds. The draw speed of coated fiber production may be greater than 25 m/s, or greater than 30 m/s, or greater than 40 m/s, or greater than 45 m/s.

EXAMPLES

Representative coated fibers in accordance with the present disclosure were fabricated and tested to demonstrate selected advantages thereof. A series of 10 fibers was prepared for this example. The fibers may be referred to as sample fibers and will be identified with numbers from 1-10 in the following discussion. Five commercial coated fibers were also considered for comparative purposes. The commercial fibers were SMF28e+® fibers available from Corning Incorporated. The commercial fibers will be identified with numbers from 11-15 in the following discussion.

Figure 5:
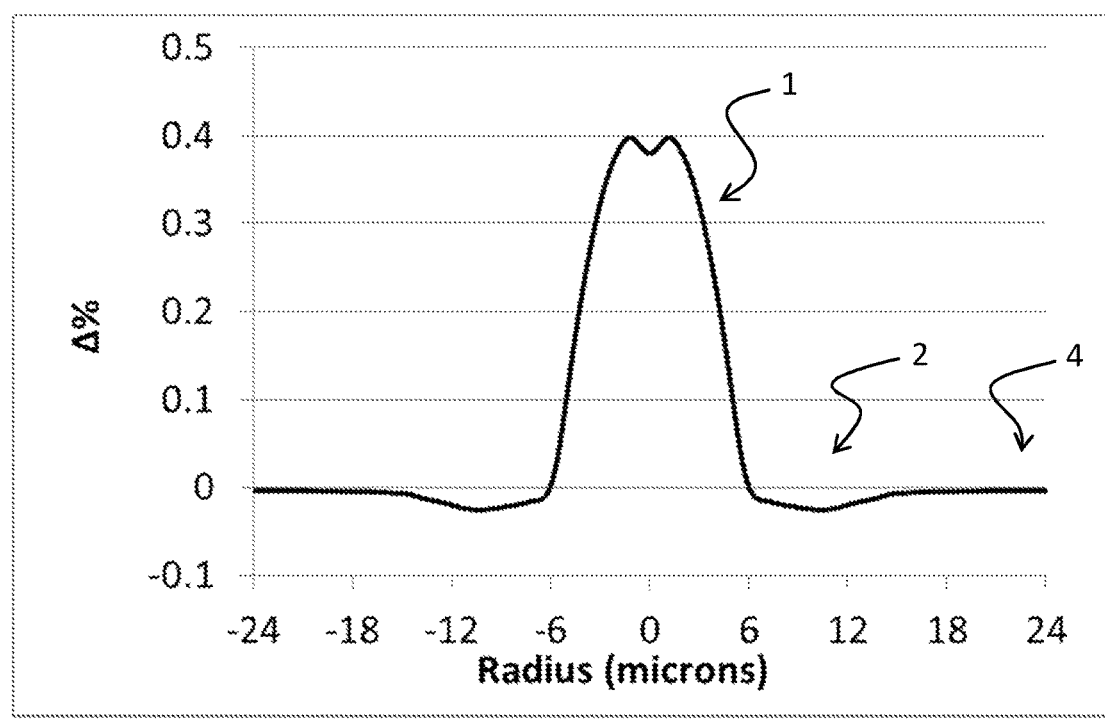
FIG. 5 shows a refractive index profile of a representative sample fiber in accordance with the present disclosure.
Figure 6:
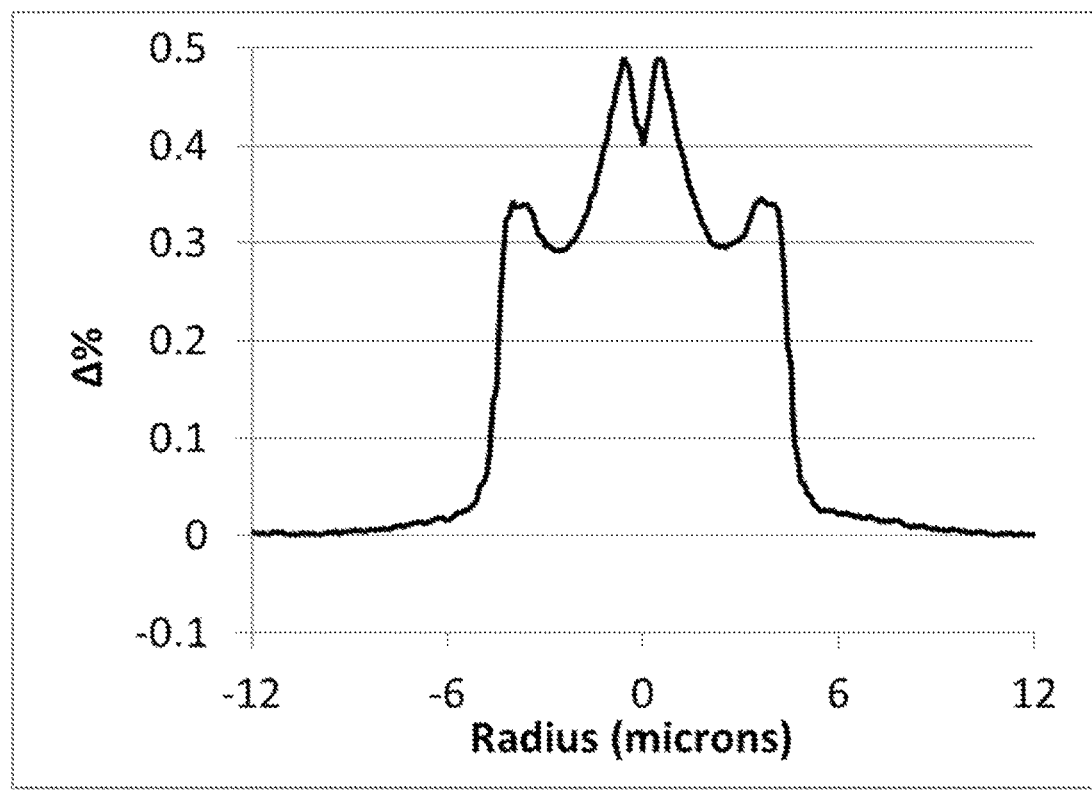
FIG. 6 shows a refractive index profile of comparative commercial fibers.

The relative refractive index profiles of sample fibers 1-10 were essentially the same. A representative profile measured for one of the fibers is shown in FIG. 5. The profile is similar to the schematic profile depicted in FIG. 3 with $\Delta_{2min} < 0\%$ and $\Delta_4 = 0\%$. In the depiction of FIG. 5, r=0 corresponds to the centerline of the fiber. Positive and negative radius values correspond to positions in the radial dimension in opposite directions from the centerline. The glass portion of sample fibers 1-10 included a central core region 1, an inner cladding region 2, and an outer cladding region 4. Outer cladding region 4 extended to an outer radius $r_4$ of 62.5 µm. Sample fibers 1-10 further included a primary coating and a secondary coating. The outer diameter of the primary coating was 190 µm and the outer diameter of the secondary coating was 242 µm. As will be discussed hereinbelow, coating characteristics and draw speed were varied over the series of sample fibers. Commercial fibers 11-15 had the SMF28e+® index profile depicted in FIG. 6 and primary and secondary coatings with characteristics described hereinbelow.

Fiber Coatings

The fibers were prepared in a conventional drawing process at speeds ranging from 42 m/s to 50 m/s. During the drawing process, primary and secondary coating compositions were applied and cured with UV radiation. The drawing station was equipped with two secondary UV lamps and one primary UV lamp to cure the primary and secondary compositions to make the coatings.

Representative curable compositions A-H for primary coatings in accordance with the present disclosure are shown below.

| Component | A | B | C | D | E | F | G | H |
|---|---|---|---|---|---|---|---|---|
| Photomer 4003 (wt %) | 41.5 | 0 | 61.5 | 41.5 | 46.5 | 46.5 | 45.5 | 47 |
| Photomer 4960 (wt %) | 0 | 41.5 | 0 | 0 | 0 | 0 | 0 | 0 |
| BR3741 (wt %) | 55 | 55 | 35 | 55 | 50 | 50 | 50 | 50 |
| N-vinyl caprolactam (wt %) | 2 | 2 | 2 | 2 | 2 | 2 | 2 | 1.5 |
| TPO (wt %) | 1.5 | 1.5 | 1.5 | 1.5 | 1.5 | 1.5 | 2.5 | 1.5 |
| (3-acryloxypropyl) trimethoxysilane (pph) | 1 | 1 | 1 | 1 | 1 | 0.8 | 0.8 | 0.8 |
| Irganox 1035 (pph) | 1 | 1 | 1 | 1 | 1 | 1 | 1 | 1 |
| Pentaerythritol mercaptopropionate (pph) | 0.03 | 0.03 | 0.03 | 0.03 | 0.03 | 0.03 | 0.03 | 0.03 |
| Uvitex OB (pph) | 0.05 | 0 | 0 | 0 | 0 | 0 | 0 | 0 |

Photomer 4003 is an ethoxylated nonyl phenol acrylate available from IGM Resins (now available as Photomer 4066). Photomer 4096 is a propoxylated nonyl phenol acrylate available from IGM Resins. BR3741 is an aliphatic polyether urethane acrylate oligomer available from Dymax Oligomers and Coatings. N-vinyl caprolactam is available from ISP Technologies, Inc. TPO is a photoinitiator available from BASF. IRGANOX 1035 is an antioxidant available from BASF. (3-acryloxypropyl) trimethoxysilane is an adhesion promoter available from Gelest. Pentaerythritol mercaptopropionate is available from Aldrich. UVITEX OB is an optical brightener available from BASF.

Curable primary composition F was applied to sample fibers 1-8. The oligomer and monomer(s) were blended together for at least 10 minutes at 60° C. The photoinitiator and additives were then added, and blending was continued for one hour. Finally, the adhesion promoter was added, and blending was continued for 30 minutes. The resulting solution was applied to the fiber and UV-cured to form a primary coating. Sample fibers 9-10 and commercial fibers 11-15 employed a commercial primary composition from the CPC6 series offered by DSM. The constituents of the CPC6 primary compositions are proprietary to the vendor and unknown to the present inventors.

Representative curable compositions J-L for secondary coatings in accordance with the present disclosure are shown below.

| Component | J | K | L |
|---|---|---|---|
| SR601/Photomer4028 (wt %) | 72 | 52 | 72 |
| CD9038 (wt %) | 10 | 0 | 10 |
| Photomer3016 (wt %) | 15 | 15 | 15 |
| SR602 (wt %) | 0 | 30 | 0 |
| KWS4131 (wt %) | 0 | 0 | 0 |
| Irgacure 184 (wt %) | 1.5 | 1.5 | 1.5 |
| TPO (wt %) | 1.5 | 1.5 | 1.5 |
| DC190 Fluid slip additive (pph) | 0 | 0 | 1 |
| Irganox 1035 (pph) | 0.5 | 1 | 1 |

SR601/Photomer 4028 is an ethoxylated (4)bisphenol A monomer available from Sartomer or IGM Resins. CD9038 is an ethoxylated (30)bisphenol A monomer available from Sartomer. Photomer 3016 is an epoxy diacrylate monomer available from IGM Resins. SR602 is an ethoxylated (10) bisphenol A monomer available from Sartomer. KWS4131 is a polyether-urethane diacrylate oligomer available from Dymax Oligomers and Coatings. IRGACURE 184 is a photoinitiator available from BASF. TPO is a photoinitiator available from BASF. DC190 is a fluid slip additive available from Dow Corning. IRGANOX 1035 is an antioxidant available from BASF.

Curable secondary composition J was applied to sample fibers 1-8 of this example. The composition was prepared from the listed components using commercial blending equipment. The monomer components were weighed, introduced into a heated kettle, and blended together at a temperature in the range from about 50° C. to 65° C. Blending was continued until a homogenous mixture was obtained. Next, the photoinitiator was weighed and introduced into the homogeneous solution while blending. Finally, the remaining components were weighed and introduced into the solution while blending. Blending was continued until a homogeneous solution was again obtained. The homogeneous solution was applied to the fiber and cured with UV radiation to form a secondary coating. Sample fibers 9-10 and commercial fibers 11-15 employed a commercial secondary composition from the CPC6 series offered by DSM. The constituents of the CPC6 secondary compositions are proprietary to the vendor and unknown to the present inventors. The in situ modulus of the CPC6 primary and secondary coatings and the glass transition temperature ($T_g$) of the CPC6 primary coating are known and are reported below.

Test Methods

Selected characteristics of the primary coating, secondary coating, and coated fiber are reported in this example. Reported characteristics of the coated fibers include mode field diameter at 1310 nm, 22 m cable cutoff wavelength, MAC# at 1310 nm, and microbend induced attenuation at 1310 nm, 1550 nm, and 1625 nm using the wire mesh covered drum test. Reported characteristics of the primary coating include the in situ modulus and glass transition temperature. Reported characteristics of the secondary coating include the in situ modulus. The mode field diameter is assessed using the Peterman II method described hereinabove. The methods used to determine the remaining reported characteristics are now described.

Cutoff Wavelength

The 2 m fiber cutoff wavelength can be measured by the standard 2 m fiber cutoff test, FOTP-80 (EIA-TIA-455-80), to yield the "fiber cutoff wavelength", also known as the "2 m fiber cutoff", "measured cutoff", or "2 m cutoff". The FOTP-80 standard test is performed to either strip out the higher order modes using a controlled amount of bending, or to normalize the spectral response of the fiber to that of a multimode fiber The 22 m cutoff wavelength is approximately the cutoff wavelength determined from the cabled cutoff test described in the EIA-445 Fiber Optic Test Procedures, which are part of the EIA-TIA Fiber Optics Standards (Electronics Industry Alliance—Telecommunications Industry Association Fiber Optics Standards, more commonly known as FOTP's). The cable cutoff measurement is described in EIA-455-170 Cable Cutoff Wavelength of Single-mode Fiber by Transmitted Power, or "FOTP-170". The cable cutoff wavelength is reported for the LP01 mode.

Microbend Losses —Wire Mesh Covered Drum Test

In the wire mesh covered drum test, a 400 mm diameter aluminum drum is wrapped with wire mesh. The mesh is wrapped tightly without stretching. The wire mesh should be intact without holes, dips, or damage. The wire mesh material used in the measurements herein was made from corrosion-resistant type 304 stainless steel woven wire cloth and had the following characteristics: mesh per linear inch: 165×165, wire diameter: 0.0019", width opening: 0.0041", and open area %: 44.0. A prescribed length (750 m) of waveguide fiber is wound at 1 m/s on the wire mesh drum at 0.050 cm take-up pitch while applying 80 (+/−1) grams of tension. The ends of the prescribed length of fiber are taped to maintain tension and there are no fiber crossovers. The attenuation of the optical fiber is measured at a selected wavelength (typically within the range of 1200-1700 nm, e.g., 1310 nm or 1550 nm or 1625 nm). A reference attenuation is measured for the optical fiber wound on a smooth drum (i.e. a drum without a wire mesh). The increase in fiber attenuation (in dB/km) in the measurement performed on the drum with the wire mesh relative to the measurement performed on the smooth drum is reported as the wire mesh covered drum attenuation of the fiber at the selected wavelength.

Primary Coating —In-Situ Modulus

A six-inch fiber sample was used for this measurement. A one-inch section from the center of the six-inch sample was window stripped and wiped with isopropyl alcohol. The sample was mounted on a sample holder/alignment stage equipped with 10 mm×5 mm aluminum tabs to which the sample was glued. Two tabs were set so that the 10 mm length was laid horizontally with and a 5 mm gap between two tabs. The fiber was laid horizontally on the sample holder across the tabs. The coated end of the fiber was positioned on one tab and extended halfway into the 5 mm space between the tabs and the stripped glass was positioned over the other half of the 5 mm gap and on the other tab. The sample was lined up and then moved out of the way so that a small dot of glue could be applied to the half of each tab closest to the 5 mm gap. The fiber was then brought back over the tabs and centered. The alignment stage was then raised until the glue just touched the fiber. The coated end was then pulled through the glue such that the majority of the sample in the 5 mm gap between the tabs was stripped glass. The very tip of the coated end was left extended beyond the glue on the tab so that the region to be measured was left exposed. The sample was left to dry. The length of fiber fixed to the tabs was trimmed to 5 mm. The coated length embedded in glue, the non-embedded length (between the tabs), and the end-face primary diameter were measured.

Measurements were performed on a Rheometrics DMTA IV instrument at a constant strain of 9e-6 1/s for forty-five minutes at room temperature (~21° C.). The gauge length was 15 mm. Force and the change in length were recorded and used for the calculation of primary modulus. Samples were prepared by removing any epoxy from the tabs that would interfere with the 15 mm clamping length to insure there was no contact with the fiber and that the sample was secured squarely to the clamps. Once the instrument force was zeroed out, the non-coated end was mounted to the lower clamp (measurement probe). The tab containing the coated end of the fiber was mounted to the upper (fixed)

clamp. The test was then executed and the sample was removed once the analysis was completed.

Primary Coating —Glass Transition Temperature ($T_g$)

The glass transition temperature of the primary coating was measured using samples in the form of cured films formed from the primary coating composition. Glass transition temperatures were measured by determining the peak of the tan δ curves obtained from an instrument such as a Rheometrics DMTA IV in tension. The width, thickness, and length of the sample were input to the "Sample Geometry" section of the program. The sample was mounted and then cooled to approximately −85° C. Once stable, a temperature ramp was run using the following parameters:
   Frequency: 1 Hz
   Strain: 0.3%
   Heating Rate: 2° C./min.
   Final Temperature: 150° C.
   Initial Static Force=20.0 [g]
   Static>Dynamic Force by=10.0 [%]
$T_g$ is defined as the maximum of the tan δ peak, where the tan δ peak is defined as:

$$\tan \delta = E''/E'$$

where E' is the loss modulus, which is proportional to the loss of energy as heat in a cycle of deformation, and E' is the storage or elastic modulus, which is proportional to the energy stored in a cycle of deformation.

Secondary Coating —In-Situ Modulus

The in situ modulus of the secondary coating was measured using fiber tube-off samples prepared from coated fibers. A 0.0055 inch miller stripper was clamped down approximately 1 inch from the end of the coated fiber. This one-inch region of fiber was immersed into a stream of liquid nitrogen and held for 3 seconds. The fiber was then removed and quickly stripped. The stripped end of the fiber was then inspected. If coating remained on the glass portion of the fiber, the tube-off sample was deemed defective and a new tube-off sample was prepared. A proper tube-off sample is one that stripped clean from the glass and consisted of a hollow tube with primary and secondary coating. The glass, primary and secondary coating diameter were measured from the end-face of the un-stripped fiber.

The fiber tube-off samples were run using a Rheometrics DMTA IV instrument at a sample gauge length 11 mm to obtain the in situ modulus of the secondary coating. The width, thickness, and length were determined and provided as input to the operating software of the instrument. The sample was mounted and run using a time sweep program at ambient temperature (21° C.) using the following parameters:
   Frequency: 1 Rad/sec
   Strain: 0.3%
   Total Time=120 sec.
   Time Per Measurement=1 sec
   Initial Static Force=15.0 [g]
   Static>Dynamic Force by=10.0 [%]

Once completed, the last five E' (storage modulus) data points were averaged. Each sample was run three times (fresh sample for each run) for a total of fifteen data points. The averaged value of the three runs was reported.

Results

Table 1 summarizes the fiber draw speed and coating characteristics of sample fibers 1-10 and commercial fibers 11-15. The in situ modulus of the primary coating of sample fibers 1-8 was 0.085 MPa and the in situ modulus of the primary coating of sample fibers 9-10 and commercial fibers 11-15 was 0.4 MPa. The glass transition temperature ($T_g$) was −55° C. for sample fibers 1-8 and −32° C. for sample fibers 9-10 and commercial fibers 11-15. The in situ modulus of the secondary coating of sample fibers 1-8 was 1700 MPa and the in situ modulus of the secondary coating of sample fibers 9-10 and commercial fibers 11-15 was 1000 MPa. The draw speed of sample fibers 1-10 ranged from 42 m/s to 50 m/s.

TABLE 1

Coating Attributes

| Fiber | Draw Speed (m/s) | Primary Composition | Primary In Situ Modulus (MPa) | $T_g$ (° C.) | Secondary Composition | Secondary In Situ Modulus (MPa) |
|---|---|---|---|---|---|---|
| 1 | 42 | F | 0.085 | −55 | J | 1700 |
| 2 | 42 | F | 0.085 | −55 | J | 1700 |
| 3 | 42 | F | 0.085 | −55 | J | 1700 |
| 4 | 45 | F | 0.085 | −55 | J | 1700 |
| 5 | 45 | F | 0.085 | −55 | J | 1700 |
| 6 | 45 | F | 0.085 | −55 | J | 1700 |
| 7 | 45 | F | 0.085 | −55 | J | 1700 |
| 8 | 50 | F | 0.085 | −55 | J | 1700 |
| 9 | 50 | CPC6 | 0.4 | −32 | CPC6 | 1000 |
| 10 | 45 | CPC6 | 0.4 | −32 | CPC6 | 1000 |
| 11 | | CPC6 | 0.4 | −32 | CPC6 | 1000 |
| 12 | | CPC6 | 0.4 | −32 | CPC6 | 1000 |
| 13 | | CPC6 | 0.4 | −32 | CPC6 | 1000 |
| 14 | | CPC6 | 0.4 | −32 | CPC6 | 1000 |
| 15 | | CPC6 | 0.4 | −32 | CPC6 | 1000 |

Table 2 summarizes measured attributes of the fibers. Sample fibers 1-8 included a glass portion with a relative refractive index profile in accordance with the present disclosure along with primary and secondary coatings in accordance with the present disclosure. Sample fibers 9-10 included a glass portion with a relative refractive index profile in accordance with the present disclosure along with commercial primary and secondary coatings. Commercial fibers 11-15 included a commercial relative refractive index profile along with commercial primary and secondary coatings. The results presented in Table 2 indicate that sample fibers 1-8 exhibit significantly-reduced wire mesh covered drum microbend attenuation losses than commercial fibers 11-15. Sample fibers 9-10 exhibit an intermediate level of microbend attenuation losses. In addition to favorable microbend performance, large mode field diameters at 1310 nm low 22 m cable cutoff wavelengths were observed for sample fibers 1-10. The improved performance of sample fibers 1-10 was observed for the full range of draw speed considered in this example.

TABLE 2

Fiber Attributes

| Fiber | MFD at 1310 nm (µm) | 2 m Cutoff (nm) | Wire Mesh Covered Drum Microbend Induced Attenuation (dB/km) | | |
|---|---|---|---|---|---|
| | | | 1310 nm | 1550 nm | 1625 nm |
| 1 | 9.24 | 1270 | 0.000 | 0.003 | 0.011 |
| 2 | 9.14 | 1268 | −0.009 | 0.000 | −0.003 |
| 3 | 9.25 | 1346 | 0.021 | 0.020 | 0.007 |
| 4 | 9.14 | 1278 | 0.012 | 0.016 | 0.024 |
| 5 | 9.19 | 1285 | 0.013 | 0.015 | 0.013 |

TABLE 2-continued

Fiber Attributes

| Fiber | MFD at 1310 nm (μm) | 2 m Cutoff (nm) | Wire Mesh Covered Drum Microbend Induced Attenuation (dB/km) | | |
|---|---|---|---|---|---|
| | | | 1310 nm | 1550 nm | 1625 nm |
| 6 | 9.22 | 1307 | 0.012 | 0.017 | 0.032 |
| 7 | 9.20 | 1285 | 0.004 | 0.013 | 0.032 |
| 8 | 9.18 | 1289 | 0.004 | 0.005 | 0.003 |
| 9 | 9.20 | 1269 | 0.012 | 0.035 | 0.055 |
| 10 | 9.20 | 1280 | 0.008 | 0.025 | 0.051 |
| 11 | 9.06 | 1294 | 0.010 | 0.032 | 0.059 |
| 12 | 9.26 | 1312 | 0.034 | 0.059 | 0.096 |
| 13 | 9.32 | 1307 | 0.014 | 0.066 | 0.106 |
| 14 | 9.16 | 1260 | 0.012 | 0.068 | 0.126 |
| 15 | 9.36 | 1252 | 0.029 | 0.105 | 0.197 |

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical waveguide fiber comprising:
a central core region having a radius $r_1$ and a relative refractive index $\Delta_1(r)$ in % measured relative to pure silica, said relative refractive index $\Delta_1(r)$ having a maximum $\Delta_{1max}$;
a cladding, said cladding including an inner cladding region surrounding said central core region and an outer cladding region surrounding said inner cladding region, said inner cladding region having an outer radius $r_2 > 8$ μm and a relative refractive index $\Delta_2(r)$ in % measured relative to pure silica, said relative refractive index $\Delta_2(r)$ having a maximum $\Delta_{2max}$ and a minimum $\Delta_{2min}$, said outer cladding region having a relative refractive index $\Delta_4$ in % measured relative to pure silica, said relative refractive index $\Delta_4$ being positive and less than said maximum $\Delta_{1max}$, said relative refractive index $\Delta_4$ exceeding said minimum $\Delta_{2min}$ by at least 0.002%;
a primary coating surrounding said outer cladding region, said primary coating having an in situ modulus of less than 0.20 MPa and an in situ glass transition temperature of less than −35° C.; and
a secondary coating surrounding said primary coating, said secondary coating having an in situ modulus of greater than 1500 MPa
wherein said fiber exhibits a wire mesh covered drum microbending loss less than 0.030 dB/km at a wavelength of 1550 nm when wound around a mesh-covered aluminum drum with a diameter of 400 mm.

2. The fiber of claim 1, wherein said relative refractive index percent profile $\Delta_1(r)$ is a super-Gaussian profile, said super-Gaussian profile being substantially described by the equation $$\Delta_1(r) = \Delta_{1max} \text{EXP}\left[-\left(\frac{r}{a}\right)^\gamma\right]$$

where $\gamma > 0$ and $a > 4.5$.

3. The fiber of claim 1, wherein said relative refractive index percent profile $\Delta_1(r)$ is an α-profile, said α-profile being substantially described by the equation $$\Delta_1(r) = \Delta_{1max}\left[1 - \left[\frac{|r - r_m|}{(r_z - m)}\right]^\alpha\right]$$

where $r_m$ is the radius at which $\Delta(r) = \Delta_{max}$, $r_z$ is the radius at which $\Delta(r) = 0$, and α is between 0.5 and 10.

4. The fiber of claim 1, wherein said relative refractive index $\Delta_4$ is at least 0.010%.

5. The fiber of claim 1, wherein the width of said inner cladding region is between 3 μm and 13 μm.

6. The fiber of claim 1, wherein said relative refractive index $\Delta_4$ exceeds said minimum $\Delta_{2min}$ by at least 0.02%.

7. The fiber of claim 1, wherein said cladding further comprises a depressed index cladding region between said inner cladding region and said outer cladding region, said depressed index cladding region having a relative refractive index $\Delta_3(r)$ with a minimum $\Delta_{3min}$, said minimum $\Delta_{3min}$ being less than said minimum $\Delta_{2min}$ by at least 0.005%, said minimum $\Delta_{3min}$ being less than said relative refractive index $\Delta_4$ by at least 0.010%.

8. The fiber of claim 1, wherein said fiber exhibits a mode field diameter greater than 8.8 μm at a wavelength of 1310 nm.

9. The fiber of claim 1, wherein said fiber exhibits a 2 m cutoff wavelength less than 1360 nm.

10. The fiber of claim 1, wherein said primary coating has an in situ glass transition temperature of less than −45° C.

11. The fiber of claim 1, wherein the outer diameter of said primary coating is less than 185 μm.

12. The fiber of claim 1, wherein said primary coating is the cured product of a primary composition that includes a urethane acrylate oligomer and a monomer selected from the group consisting of (meth)acrylates, N-vinyl amides, and epoxy acrylates.

13. The fiber of claim 12, wherein said primary composition comprises one or more monofunctional (meth)acrylate monomers in an amount of from about 5 to 95% by weight; an N-vinyl amide monomer in an amount of from about 0.1 to 40% by weight; and one or more difunctional urethane acrylate oligomers which comprise a polyol and an isocyanate, said oligomer present in an amount of from about 5 to 95% by weight, wherein the polyol in said oligomer is a polypropylene glycol and the isocyanate in said oligomer is an aliphatic diisocyanate.

14. The fiber of claim 12, wherein said primary composition comprises one or more monofunctional (meth)acrylate monomers in an amount of from about 40 to 65% by weight; an N-vinyl amide monomer in an amount of from about 2 to 10% by weight; and one or more polypropylene glycol-based difunctional urethane acrylate oligomers in an amount of from about 35 to 60% by weight.

15. The fiber of claim 1, wherein said secondary coating has an in situ modulus of 1800 MPa or greater.

16. The fiber of claim 1, wherein said secondary coating is the cured product of a secondary composition that lacks urethane-containing oligomers.

17. The fiber of claim 16, wherein said secondary composition comprises a monomer selected from the group consisting of alkoxylated bisphenol-A diacrylate, alkylene glycol acrylate, and epoxy diacrylate.

18. The fiber of claim 17, wherein said secondary composition comprises:
about 40 to 80% by weight of ethoxylated (4) bisphenol A monomer;
from about 0 to about 30% by weight of ethoxylated (10) bisphenol A monomer;
from about 0 to about 25% by weight of ethoxylated (30) bisphenol A monomer; and
from about 5 to 18% by weight of epoxy acrylate.

19. The fiber of claim 1, wherein said mode field diameter is greater than 9.0 μm at a wavelength of 1310 nm, said 2 m cutoff wavelength is less than 1320 nm, and said wire mesh covered drum microbending loss is less than 0.020 dB/km at a wavelength of 1550 nm when wound around a mesh-covered aluminum drum with a diameter of 400 mm.

20. The fiber of claim 19, wherein said wire mesh covered drum microbending loss is less than 0.010 dB/km at a wavelength of 1550 nm.

21. The fiber of claim 1, wherein said fiber is formed at a draw speed of at least 40 m/s.

22. An optical waveguide fiber comprising:
a central core region having a radius $r_1$ and a relative refractive index $\Delta_1(r)$ in % measured relative to pure silica, said relative refractive index $\Delta_1(r)$ having a maximum $\Delta_{1max}$;
a cladding, said cladding including an inner cladding region surrounding said central core region and an outer cladding region surrounding said inner cladding region, said inner cladding region having an outer radius $r_2>8$ μm and a relative refractive index $\Delta_2(r)$ in % measured relative to pure silica, said relative refractive index $\Delta_2(r)$ having a maximum $\Delta_{2max}$ and a minimum $\Delta_{2min}$, said outer cladding region having a relative refractive index $\Delta_4$ in % measured relative to pure silica, said relative refractive index $\Delta_4$ being positive and less than said maximum $\Delta_{1max}$, said relative refractive index $\Delta_4$ exceeding said minimum $\Delta_{2min}$ by at least 0.002%;
a primary coating surrounding said outer cladding region, said primary coating having an in situ modulus of less than 0.20 MPa and an in situ glass transition temperature of less than −35° C.; and
a secondary coating surrounding said primary coating, said secondary coating having an in situ modulus of greater than 1500 MPa;
wherein said fiber exhibits a 2 m cutoff wavelength less than 1360 nm.

23. An optical waveguide fiber comprising:
a central core region having a radius $r_1$ and a relative refractive index $\Delta_1(r)$ in % measured relative to pure silica, said relative refractive index $\Delta_1(r)$ having a maximum $\Delta_{1max}$;
a cladding, said cladding including an inner cladding region surrounding said central core region and an outer cladding region surrounding said inner cladding region, said inner cladding region having an outer radius $r_2>8$ μm and a relative refractive index $\Delta_2(r)$ in % measured relative to pure silica, said relative refractive index $\Delta_2(r)$ having a maximum $\Delta_{2max}$ and a minimum $\Delta_{2min}$, said outer cladding region having a relative refractive index $\Delta_4$ in % measured relative to pure silica, said relative refractive index $\Delta_4$ being positive and less than said maximum $\Delta_{1max}$, said relative refractive index $\Delta_4$ exceeding said minimum $\Delta_{2min}$ by at least 0.002%;
a primary coating surrounding said outer cladding region, said primary coating having an in situ modulus of less than 0.20 MPa and an in situ glass transition temperature of less than −35° C.; and
a secondary coating surrounding said primary coating, said secondary coating having an in situ modulus of greater than 1500 MPa;
wherein said mode field diameter is greater than 9.0 μm at a wavelength of 1310 nm, said 2 m cutoff wavelength is less than 1320 nm, and said wire mesh covered drum microbending loss is less than 0.020 dB/km at a wavelength of 1550 nm when wound around a mesh-covered aluminum drum with a diameter of 400 mm.

* * * * *